(12) United States Patent
Matsunaga et al.

(10) Patent No.: US 12,039,591 B2
(45) Date of Patent: Jul. 16, 2024

(54) INFORMATION PROCESSING APPARATUS, INFORMATION PROCESSING METHOD, STORAGE MEDIUM, PORTABLE ELECTRIC POWER SUPPLY APPARATUS, AND RENTAL SYSTEM

(71) Applicant: HONDA MOTOR CO., LTD., Tokyo (JP)

(72) Inventors: Yoshihiro Matsunaga, Wako (JP); Sho Takada, Wako (JP); Mitsuhiro Ito, Wako (JP); Nobuyuki Sasaki, Wako (JP); Mio Oshima, Wako (JP); Ryo Oshima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 911 days.

(21) Appl. No.: 17/021,487

(22) Filed: Sep. 15, 2020

(65) Prior Publication Data

US 2021/0019820 A1 Jan. 21, 2021

Related U.S. Application Data

(63) Continuation of application No. PCT/JP2018/047050, filed on Dec. 20, 2018.

(30) Foreign Application Priority Data

Mar. 20, 2018 (JP) ................................. 2018-052589

(51) Int. Cl.
*G06Q 30/0645* (2023.01)
*G06F 16/955* (2019.01)
(Continued)

(52) U.S. Cl.
CPC ....... *G06Q 30/0645* (2013.01); *G06F 16/955* (2019.01); *G06Q 30/0207* (2013.01); *G06Q 30/0283* (2013.01); *G06Q 50/06* (2013.01)

(58) Field of Classification Search
CPC .......... G06Q 30/0645; G06Q 30/0207; G06Q 30/0283; G06Q 50/06; G06F 16/955
See application file for complete search history.

(56) References Cited

U.S. PATENT DOCUMENTS

| 5,349,535 A * | 9/1994 | Gupta | ................... B60L 53/665 |
| | | | 705/400 |
| 6,177,879 B1 * | 1/2001 | Kokubu | ................... B62M 6/90 |
| | | | 340/432 |

(Continued)

FOREIGN PATENT DOCUMENTS

| JP | 2003288539 A | 10/2003 |
| JP | 2004126669 A | 4/2004 |

(Continued)

OTHER PUBLICATIONS

PCT Search Report and Written Opinion in co-pending related PCT Application No. PCT/JP2018/047050, mailed Mar. 12, 2019.

*Primary Examiner* — Dennis W Ruhl
(74) *Attorney, Agent, or Firm* — Thomas| Horstemeyer, LLP

(57) ABSTRACT

An information processing apparatus comprises an acquisition unit configured to acquire information according to the usage circumstances of an portable electric power supply apparatus; an estimation unit configured to estimate a type of an electrical device that is connected, based on a measurement result with respect to a voltage and a current when the portable electric power supply apparatus supplied electric power that is included in the information according to the usage circumstances; a determination unit configured to determine whether or not an electrical device that is estimated by the estimation unit is a predetermined designated device; and a decision unit configured to decide on a user treatment with respect to a user that rented the portable (Continued)

electric power supply apparatus, in accordance with a determination result obtained by the determination unit.

14 Claims, 12 Drawing Sheets

(51) Int. Cl.
*G06Q 30/0207* (2023.01)
*G06Q 30/0283* (2023.01)
*G06Q 50/06* (2024.01)

(56) References Cited

U.S. PATENT DOCUMENTS

| | | | |
|---|---|---|---|
| 2004/0148083 A1* | 7/2004 | Arakawa | G07C 5/085 |
| | | | 701/50 |
| 2007/0150295 A1* | 6/2007 | Dawson | G06Q 40/00 |
| | | | 705/35 |
| 2013/0066791 A1* | 3/2013 | Sakamoto | H02J 3/32 |
| | | | 705/307 |
| 2014/0028242 A1* | 1/2014 | Akin | H02J 7/35 |
| | | | 320/101 |
| 2017/0085103 A1* | 3/2017 | Seng | H05K 5/0278 |
| 2017/0263984 A1* | 9/2017 | Fujita | G01R 31/392 |
| 2018/0253788 A1* | 9/2018 | Takatsuka | H01M 10/441 |

FOREIGN PATENT DOCUMENTS

| | | | |
|---|---|---|---|
| JP | 2007267519 A | 10/2007 | |
| JP | 2013084199 A | 5/2013 | |
| WO | 2015080285 A1 | 6/2015 | |
| WO | 2017145511 A | 8/2017 | |

* cited by examiner

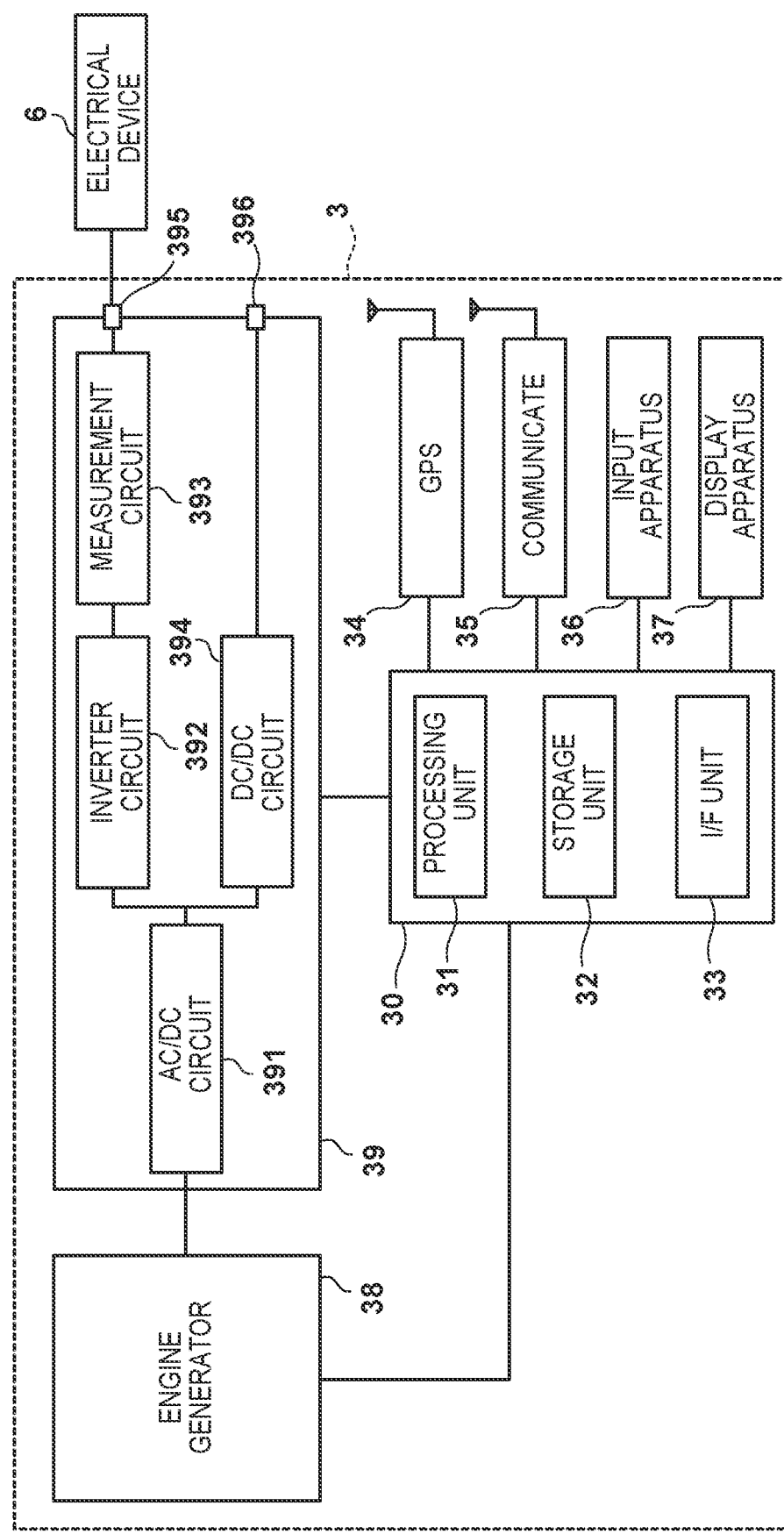

INFORMATION PROCESSING APPARATUS, INFORMATION PROCESSING METHOD, STORAGE MEDIUM, PORTABLE ELECTRIC POWER SUPPLY APPARATUS, AND RENTAL SYSTEM

CROSS-REFERENCE TO RELATED APPLICATION(S)

This application is a continuation of International Patent Application No. PCT/JP2018/047050 filed on Dec. 20, 2018, which claims priority to and the benefit of Japanese Patent Application No. 2018-052589 filed on Mar. 20, 2018, the entire disclosures of which are incorporated herein by reference.

TECHNICAL FIELD

The present invention relates to an information processing apparatus, an information processing method, a storage medium, a portable electric power supply apparatus and a rental system.

BACKGROUND ART

Portable electric power supply apparatuses such as portable storage batteries or electric generators are known. In addition to use in the home, because a portable electric power supply apparatus can be easily carried, it is also possible to use a portable electric power supply apparatus away from the home, such as at a campsite, and a portable electric power supply apparatus can supply electric power to various kinds of electrical devices. On the other hand, portable electric power supply apparatuses are relatively expensive for individuals to purchase, and although portable electric power supply apparatuses are being made more compact, they still remain a reasonably large size. Hence, there is a tendency for users to refrain from purchasing a portable electric power supply apparatus in a case where the principal purpose is use away from the home or the like, and the portable electric power supply apparatus will not be used on a routine basis. Therefore, rental services that allow users to rent portable electric power supply apparatuses are provided to meet the power supply needs of such users.

In PTL1, a system is proposed in which battery pack data that shows the usage circumstances of a rental battery pack constituted by a secondary battery is transmitted to a rental company through a network, and a fee for using the battery pack is calculated and charged based on the number of charge and discharge cycles which is obtained from the battery pack data.

CITATION LIST

Patent Literature

PTL1: Japanese Patent Laid-Open No. 2003-288539

SUMMARY OF THE INVENTION

Technical Problem

However, the following problems exist with regard to the aforementioned prior art. For example, rechargeable batteries provided in portable electric power supply apparatuses and the like are of various kinds that are differentiated based on the constituent materials thereof, such as lithium ions, nickel-metal hydride, and nickel-cadmium. In the case of these rechargeable batteries, there is a suitable method of use for each type of rechargeable battery, and if the respective rechargeable batteries are used in a way that is not appropriate, deterioration of the battery will be hastened and the lifespan of the battery will be unnecessarily shortened. Further, if a portable electric power supply apparatus is used in a manner in which the rated output thereof is exceeded, or if a portable electric power supply apparatus is used in a manner in which the amount of discharge within a predetermined time unit exceeds a predetermined value, such use will hasten the deterioration of various components of a rechargeable battery or an electric generator thereof. In addition, the electric power characteristics at start-up and during use differ depending on the type of electrical device to which the electric power is supplied, and the degree of deterioration of various components of a rechargeable battery or an electric generator will differ depending on differences with respect to discharging as well as the timing of charging and the like of the rechargeable battery or electric generator.

Because of such circumstances, rental companies and the like that rent out portable electric power supply apparatuses want their customers to utilize the portable electric power supply apparatuses according to the appropriate usage method and for designated electrical devices. However, portable electric power supply apparatuses are used at rental destinations, and it is therefore difficult to place restrictions on the manner in which the portable electric power supply apparatuses are utilized. Therefore, it is conceivable to promote appropriate utilization by varying the treatment that is adopted with respect to a user in accordance with whether or not the relevant user utilized an appropriate usage method and an appropriate electrical device. Note that, in the aforementioned prior art, although a usage charge is calculated in a manner that takes into account the number of times that a rental battery pack was charged as the usage circumstances of the rental battery pack, whether or not the usage method or the type of electrical device used and the like are appropriate is not taken into account, and it is difficult to adopt different treatments with respect to the users in accordance with differences in the usage methods or the types of electrical devices.

An object of the present invention is to suitably acquire the usage circumstances of a portable electric power supply apparatus at a rental destination, and control the treatment adopted with respect to a user according to whether or not the portable electric power supply apparatus was used appropriately.

Solution to Problem

According to the present invention there is provided an information processing apparatus managing usage circumstances at a rental destination of a portable electric power supply apparatus supplying electric power to a detachably connected electrical device, including: an acquisition unit configured to acquire information according to the usage circumstances of the portable electric power supply apparatus; an estimation unit configured to estimate a type of an electrical device that is connected, based on a measurement result with respect to a voltage and a current when the portable electric power supply apparatus supplied electric power that is included in the information according to the usage circumstances; a determination unit configured to determine whether or not an electrical device that is estimated by the estimation unit is a predetermined designated device; and a decision unit configured to decide on a user treatment with respect to a user that rented the portable electric power supply apparatus, in accordance with a determination result obtained by the determination unit.

Further, according to the present invention there is provided an information processing method for managing usage circumstances at a rental destination of a portable electric power supply apparatus supplying electric power to a detachably connected electrical device, including: an information processing apparatus acquiring information according to the usage circumstances of the portable electric power supply apparatus; the information processing apparatus estimating a type of an electrical device that is connected, based on a measurement result with respect to a voltage and a current when the portable electric power supply apparatus supplied electric power that is included in the information according to the usage circumstances; the information processing apparatus determining whether or not an electrical device which is estimated by the estimating is a predetermined designated device; and the information processing apparatus deciding on a user treatment with respect to a user that rented the portable electric power supply apparatus, in accordance with a determination result obtained by the determining.

Further, according to the present invention there is provided a non-transitory computer-readable storage medium storing a program that operates in an information processing apparatus managing usage circumstances at a rental destination of a portable electric power supply apparatus supplying electric power to a detachably connected electrical device, including: an acquisition step of the information processing apparatus acquiring information according to the usage circumstances of the portable electric power supply apparatus; an estimation step of the information processing apparatus estimating a type of an electrical device that is connected, based on a measurement result with respect to a voltage and a current when the portable electric power supply apparatus supplied electric power that is included in the information according to the usage circumstances; a determination step of the information processing apparatus determining whether or not an electrical device which is estimated in the estimation step is a predetermined designated device; and a decision step of the information processing apparatus deciding on a user treatment with respect to a user that rented the portable electric power supply apparatus, in accordance with a determination result obtained in the determination step.

Further, according to the present invention there is provided a portable electric power supply apparatus supplying electric power to a detachably connected electrical device, comprising: at least one of an electric generator and a storage battery configured to supply electric power to the connected electrical device; a measurement unit configured to measure a voltage and a current when electric power is supplied by at least one of the electric generator and the storage battery; a transmission unit configured to transmit a measurement result that is measured by the measurement unit to a communicably connected external apparatus; and a control unit configured to, upon receiving a response to the transmission by the transmission unit from the external apparatus, display information to a user on a display unit in accordance with response information that is received; wherein the user treatment is decided on using a type of the connected electrical device that is estimated based on the measurement result, in the external apparatus.

Further, according to the present invention there is provided a rental system including a portable electric power supply apparatus supplying electric power to a detachably connected electrical device, and an information processing apparatus managing usage circumstances of the portable electric power supply apparatus at a rental destination, wherein: the portable electric power supply apparatus comprises: at least one of an electric generator and a storage battery configured to supply electric power to the connected electrical device, a measurement unit configured to measure a voltage and a current when electric power is supplied by at least one of the electric generator and the storage battery, a transmission unit configured to transmit a measurement result that is measured by the measurement unit to a communicably connected external apparatus, and a control unit configured to, upon receiving a response to the transmission by the transmission unit from the external apparatus, displaying information to a user on a display unit in accordance with response information that is received; and the information processing apparatus comprises: an acquisition unit configured to acquire information according to the usage circumstances of the portable electric power supply apparatus, an estimation unit configured to estimate a type of an electrical device that is connected, based on a measurement result with respect to a voltage and a current when the portable electric power supply apparatus supplied electric power that is included in the information according to the usage circumstances, a determination unit configured to determine whether or not an electrical device that is estimated by the estimation unit is a predetermined designated device, a decision unit configured to decide on a user treatment with respect to a user that rented the portable electric power supply apparatus, in accordance with a determination result obtained by the determination unit, and a notification unit configured to notify a user treatment that is decided on by the decision unit to the portable electric power supply apparatus.

Advantageous Effects of Invention

According to the present invention, the usage circumstances of a portable electric power supply apparatus at a rental destination can be suitably acquired, and a treatment with respect to a user can be controlled according to whether or not the portable electric power supply apparatus was used appropriately.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 14 is a block diagram of a portable electric power supply apparatus according to a different example.

DESCRIPTION OF THE EMBODIMENTS

First Embodiment

<Configuration of System>

Figure 1:
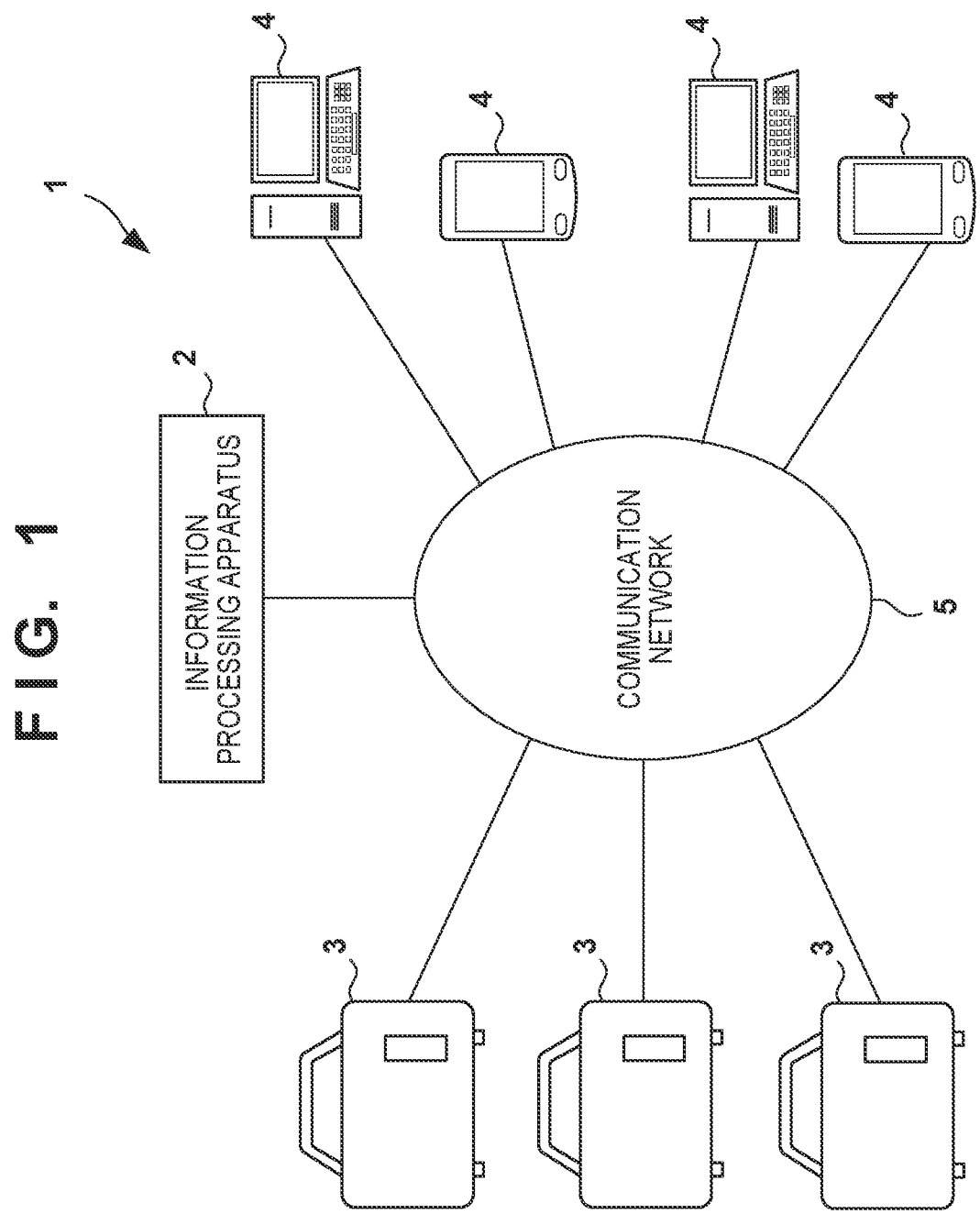
FIG. 1 is a schematic diagram of a rental system according to one embodiment of the present invention.

Hereinafter, a first embodiment of the present invention will be described. In the present embodiment, a rental system 1 in a case where a portable electric power supply apparatus is equipped with a communication function will be described. FIG. 1 is a schematic diagram of the rental system 1. The rental system 1 includes an information processing apparatus 2 that is a management server, a plurality of portable electric power supply apparatuses 3, and a plurality of terminals 4 which are communicably connected through a communication network 5. Although three of the portable electric power supply apparatuses 3 are illustrated in the example in FIG. 1, the example illustrated in FIG. 1 is not intended to limit the present invention, and a large number of the portable electric power supply apparatuses 3 can constitute part of the system 1. Likewise, although four of the terminals 4 are illustrated in the example in FIG. 1, a large number of the terminals 4 can constitute part of the system 1. Note that, the information processing apparatus 2 and the terminals 4 can be external apparatuses with respect to the plurality of portable electric power supply apparatuses 3.

The information processing apparatus 2 is a computer that functions as a management server in the rental system 1, and manages information according to respective portable electric power supply apparatuses that are provided by service providers, described later. A portable electric power supply apparatus (hereinafter, referred to simply as "electric power supply apparatus") 3 is an apparatus that supplies electric power to an electrical device, and is a portable type apparatus and not a stationary type apparatus. Accordingly, the portable electric power supply apparatus 3 can be carried to a usage site in accordance with the intended use of the user, such as for leisure use, business use, or use in an emergency situation.

The terminal 4 is a computer that is used by a service provider that operates a rental service for renting the electric power supply apparatus 3 or the like, and for example is a personal computer or a hand-held device. The terminal 4 is equipped with a display device and a communication device. The term "service provider" refers to a merchant who provides a product or renders a service to a user of the electric power supply apparatus 3. It is assumed that different merchants utilize the respective terminals 4.

In the rental system 1, the information processing apparatus 2 gathers information according to the usage circumstances of the electric power supply apparatus 3 from the electric power supply apparatus 3 through the communication network 5 such as the Internet, and provides the gathered information to the terminal 4. By means of the information that is provided, the service provider acquires information according to the usage circumstances of the electric power supply apparatus 3 of each user. That is, the provided information can be utilized for deciding a treatment to be adopted with respect to each user. The operator of the information processing apparatus 2 may also provide the information in exchange for a consideration from the service provider. Based on the information according to the usage circumstances of the electric power supply apparatus 3, the user of the electric power supply apparatus 3 is notified of various kinds of information such as usage guidance information or information that serves to warn the user, and a special privilege may be granted to the user or a penalty may be imposed on the user according to whether or not the electric power supply apparatus 3 is used appropriately. The special privilege that is granted or the penalty that is imposed may be implemented by, for example, subjecting the rental fee to a discount or a surcharge.

<Portable Electric Power Supply Apparatus>

Figure 2:
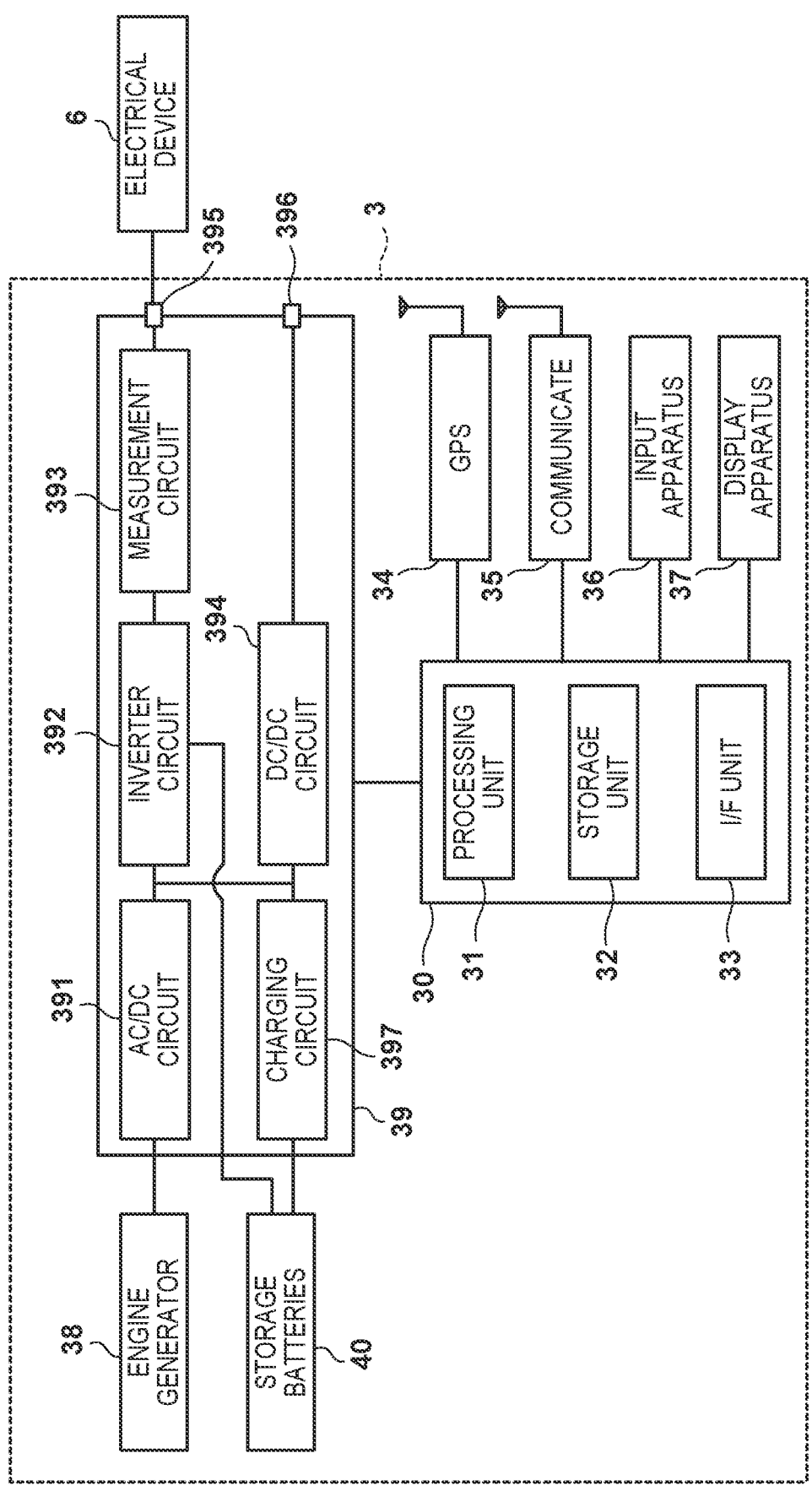
FIG. 2 is a block diagram of a portable electric power supply apparatus according to one embodiment of the present invention.

FIG. 2 is a block diagram of the electric power supply apparatus 3. The electric power supply apparatus 3 of the present embodiment is an electric power supply apparatus of a type that is equipped with both an engine generator 38 and storage battery 40. The engine generator 38 of the present embodiment is driven by fuel to generate alternating-current electric power. The fuel is, for example, gasoline, liquefied petroleum gas or hydrogen. The storage battery 40 is a battery in which, for example, lithium ions, nickel-metal hydride, or nickel-cadmium is employed as a constituent material, and which outputs a DC voltage of 48 V or the like to an inverter circuit 392 or a DC/DC circuit 394.

A power supply circuit 39 is a circuit that converts a voltage generated by the engine generator 38 into a predetermined alternating current or direct current. The AC/DC circuit 391 has a rectifying and smoothing circuit that rectifies and smoothes an alternating current generated by the engine generator 38, or the like. The inverter circuit 392 converts a direct current generated by the AC/DC circuit 391 or a direct current supplied from the storage battery 40 into stable alternating current of a predetermined frequency. The charging circuit 397 charges the storage battery 40 based on electric power generated by the engine generator 38. The electric power supply apparatus 3 illustrated in FIG. 2 is capable of supplying electric power that is stored in the storage battery 40 to an electrical device 6 even after the fuel of the engine generator 38 runs out.

A measurement circuit 393 includes a current sensor and a voltage sensor, and measures an AC voltage and an AC current supplied from the inverter circuit 392 to an electrical device 6 connected to an AC outlet 395, and outputs the measurement result to a control circuit 30. The electrical device 6 that is capable of driving by means of alternating-current electric power is detachably connected to the AC outlet 395. In a case where the electric power supply apparatus 3 is used for leisure purposes, examples of the electrical device 6 that may be mentioned include a cooking device, an air conditioner, a television, a lighting device, and a dryer. Examples of the cooking device that may be mentioned include a hot plate, a kettle, a microwave oven, a grill, and a blender. In a case where the electric power supply apparatus 3 is used for business purposes, examples of the electrical device 6 that may be mentioned include an electric power tool, a large-size lighting apparatus, and a compressor.

The DC/DC circuit 394 converts the level of a DC voltage that is output from the AC/DC circuit 391, and supplies an operating voltage to the control circuit 30 and the like, and outputs an operating voltage to a DC outlet 396. The electrical device 6 that can be driven by DC power is detachably connected to the DC outlet 396.

The control circuit 30 is a circuit that performs control of the electric power supply apparatus 3. The control circuit 30 includes a processing unit 31, the storage unit 32 and an I/F (interface) unit 33. The processing unit 31 is a processor that is typified by a CPU, and executes a program stored in the storage unit 32. The storage unit 32 is a storage device such as a RAM, a ROM, or a hard disk. In addition to a program that the processing unit 31 executes, various kinds of data are also stored in the storage unit 32. The I/F unit 33 relays signals that are exchanged between an external device and the processing unit 31.

A GPS sensor 34 detects the current position of the electric power supply apparatus 3. A communication apparatus 35 is a radio communication apparatus which carries out communication of information between the information processing apparatus 2 and the terminal 4 through the communication network 5. An input apparatus 36 is an apparatus that accepts input of operations by a user of the electric power supply apparatus 3, and for example is a plurality of switches. The display apparatus 37 is an apparatus that displays information to a user of the electric power supply apparatus 3, and for example is an image display apparatus such as a liquid crystal display or is a light emitting device such as an LED. A touch panel-type liquid crystal display may be adopted. In such a case, the display apparatus 37 will include a part of the input apparatus 36.

The processing unit 31 transmits information regarding the current position that is detected by the GPS sensor 34 and a measurement result of the measurement circuit 393 to the information processing apparatus 2 by means of the communication apparatus 35, and executes processing of a program stored in the storage unit 32. A measurement result of the measurement circuit 393 can be utilized as information according to the type of electrical device 6 connected to the AC outlet 395 of the electric power supply apparatus 3, and in particular can be utilized to estimate the type of electrical device 6. Electric power that is supplied to the electrical device 6 exhibits a waveform whose characteristics are determined by the type of electrical device 6. The type of the electrical device 6 that is connected can be estimate based on feature values of the waveform. Further, by means of the waveform, the electric power supply amount can be ascertained, and the usage method can be identified.

The feature values are, for example, an apparent power and a power factor. The power factor is obtained by dividing the effective power by the apparent power, or is determined as the cosine ($\cos \theta$) of the phase difference between the voltage and the current. In the latter case, the measurement circuit 393 measures a phase difference $\theta$. In addition, the feature values may include a time period from when the electrical device 6 starts up until the electrical device 6 operates stably, or a peak value of a starting current flowing to the electrical device 6 when the electrical device 6 starts up. The relation between the kinds of electrical device 6 and the feature values can be represented in advance in data format as a feature value map, and the type of electrical device 6 can be estimated by comparing the feature values measured by the measurement circuit 393 with the feature value map.

Figure 4:
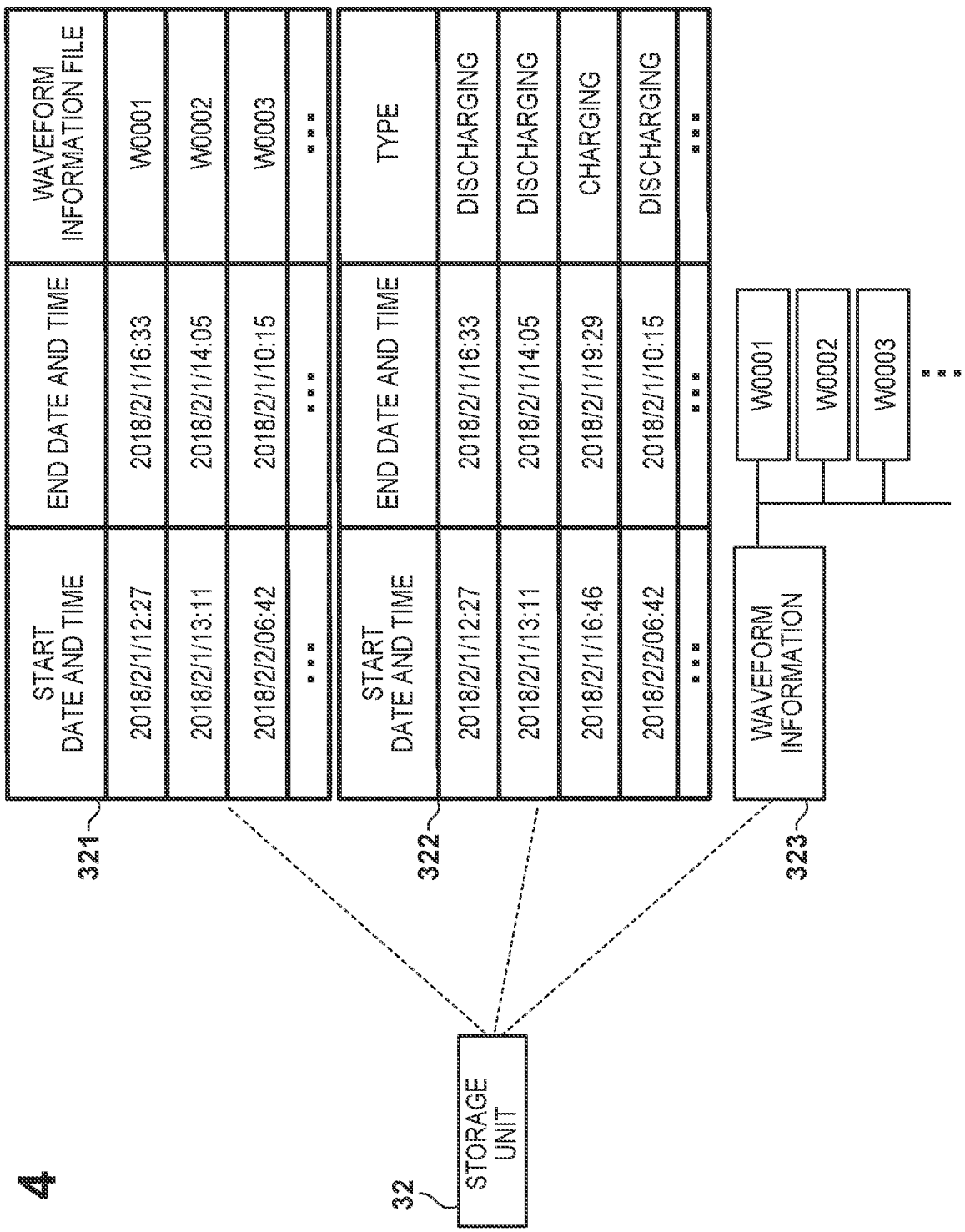
FIG. 4 is a view illustrating information that is held in a storage unit 32 of the portable electric power supply apparatus.

FIG. 4 illustrates various kinds of information 321 to 323 stored in the storage unit 32 during use, in the electric power supply apparatus 3. Various kinds of information according to the stored waveforms mentioned above is stored as the information 321. The item "Start Date and Time" shows the date and time that storing of the waveform started, and the item "End Date and Time" shows the date and time that storing of the relevant waveform ended. The item "Waveform Information File" is an identifier that shows the file of stored waveform information. The waveform information file that corresponds to the relevant identifier is included in the waveform information 323.

Information according to charging/discharging of the engine generator 38 and the storage battery 40 is stored as the information 322. The item "Start Date and Time" shows the date and time that charging/discharging started, and the item "End Date and Time" shows the date and time that the storing of charging/discharging ended. The item "Type" shows the type of the stored charging/discharging, for example, the "Type" item includes information indicating "Charging" or "Discharging". In addition to storing such information according to charging/discharging, a configuration may be adopted in which information according to the amount of discharging and the amount of charging, respectively, is stored. Further, with respect to "Discharging", it is desirable that information is stored in a manner that enables identification of which one among the engine generator 38 and the storage battery 40 was used for discharging.

The information stored in the storage unit 32 may be transferred by the communication apparatus 35 through the communication network 5 to the information processing apparatus 2 or to the terminal 4 of the service provider that provided the relevant electric power supply apparatus 3. Alternatively, when the relevant electric power supply apparatus 3 is returned to the service provider, the information stored in the storage unit 32 may be read to the terminal 4 through a USB (universal serial bus) connection or the like. The various kinds of information described above are used for controlling a user treatment that is described later.

<Information Processing Apparatus>

Figure 3:
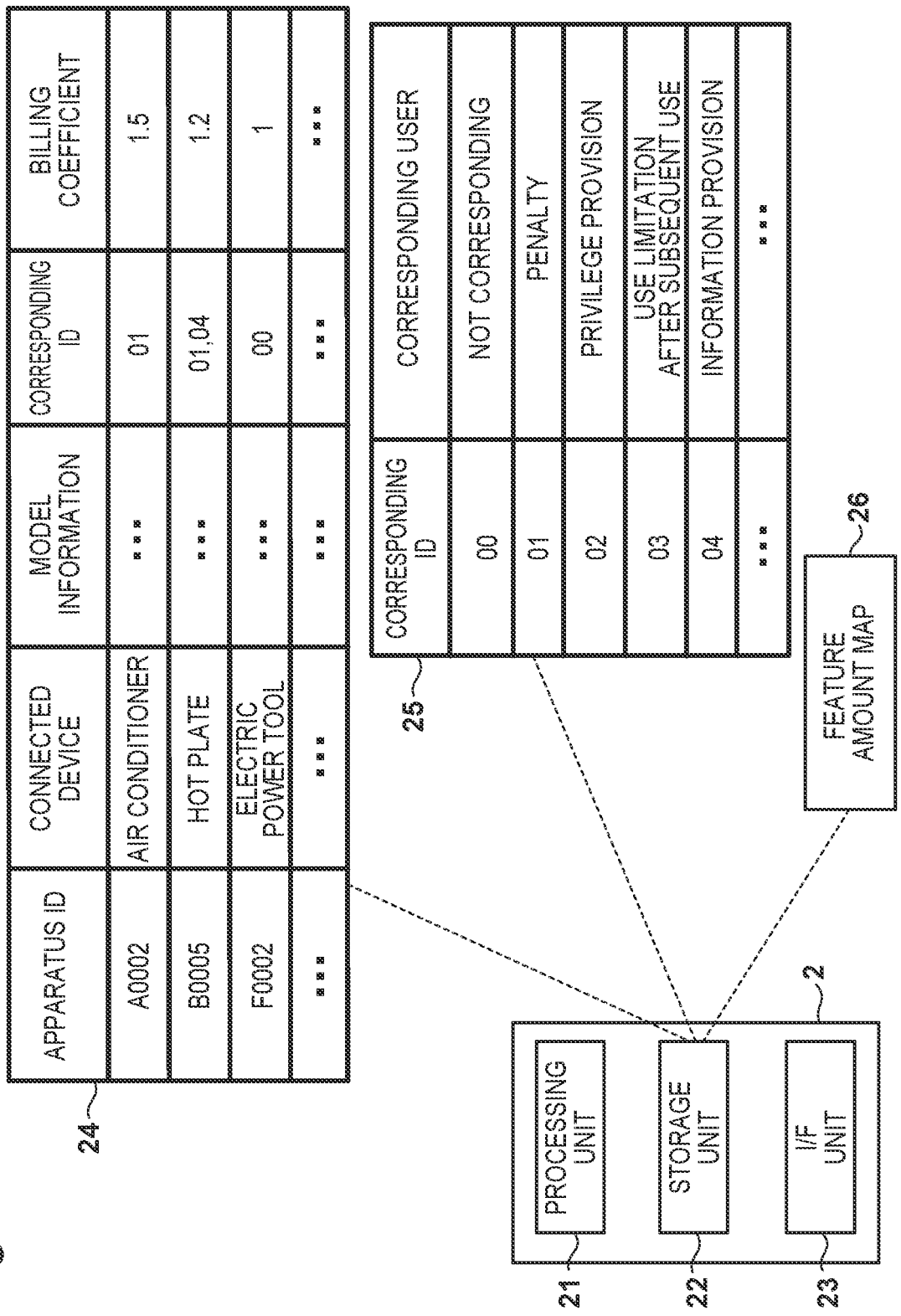
FIG. 3 is a block diagram of an information processing apparatus according to one embodiment of the present invention.

FIG. 3 is a block diagram of the information processing apparatus 2 that is a management server that manages the rental system 1. The information processing apparatus 2 includes a processing unit 21, a storage unit 22 and an I/F (interface) unit 23. The processing unit 21 is a processor that is typified by a CPU, and reads a program stored on a ROM or a HDD included in the storage unit 22 to a RAM and executes the program. The I/F unit 23 relays signals that are exchanged between an external device and the processing unit 21. The I/F unit 23 includes a wired or wireless communication interface that is capable of communicating with the electric power supply apparatus 3 and the terminal 4 through the communication network 5. The storage unit 22 is a storage device such as a RAM, a ROM or a hard disk.

Various kinds of data are stored in the storage unit 22, in addition to a program that the processing unit 31 executes. In the example illustrated in FIG. 3, databases 24 to 26 are illustrated as examples of data stored in the storage unit 22.

The database 24 is a database which stores data relating to the electric power supply apparatus 3. The item "Device ID" is an identifier that is assigned in order to identify electrical devices connected to individual electric power supply apparatuses 3. In the case of the present embodiment, the identifier is assigned in advance to a predetermined electrical device. However, a configuration can also be adopted in which the identifier is assigned when performing communication. Further, when a new electrical device that the information processing apparatus 2 does not recognize is used with the electric power supply apparatus 3, the aforementioned kinds of information may be acquired and a new identifier assigned, and the new electrical device may be registered in the database 24.

The item "Connected Device" is information showing the kinds of electrical device 6 currently connected to the electric power supply apparatus 3. In the case of the present embodiment, the database 26 is a database which stores a feature value map. The processing unit 21 estimates the type of an electrical device 6 that is currently connected to the electric power supply apparatus 3 by comparing information according to the type of electrical device 6 that is transmitted from the electric power supply apparatus 3 (in this case, a measurement result of a measurement circuit 398) with the feature value map, and stores the estimation result as a "connected device". Note that, the information according to the type of electrical device 6 that is transmitted from the electric power supply apparatus 3 may be the actual measurement result of the measurement circuit 398, or may be feature values calculated on the electric power supply apparatus 3 side. Further, in the present embodiment, although a form is adopted in which the type of electrical device 6 is estimated on the information processing apparatus 2 side, a form may be adopted in which the type of the electrical device 6 is estimated on the electric power supply apparatus 3 side, and the estimation result is transmitted to the information processing apparatus 2 as information according to the type of the electrical device 6.

The item "Model Information" is information according to the specifications of the electric power supply apparatus 3. For example, the information pertains to the drive system, the inrush current, the electric power consumption in a steady state, or the like. The item "Treatment ID" is an identifier indicating the classification of the treatment to be performed with respect to the user in a case where supply of electric power to the relevant connected device is performed by means of the electric power supply apparatus 3. The treatment ID is associated with information indicating the actual user treatment in the database 25 that is described later. The item "billing coefficient" shows a discount rate or a surcharge with respect to the rental fee for the user that rented the electric power supply apparatus 3, in a case where supply of electric power to the relevant connected device was performed by the electric power supply apparatus 3.

The database 25 is a database that shows the contents of the user treatment that is associated with each treatment ID. In the present embodiment, the treatment to be performed with respect to the user is controlled for each connected device that the user connects to the electric power supply apparatus 3 and supplies power to, and the contents of the respective treatments are defined in detail. The administrator registers each treatment in advance, and provides the treatments to each terminal 4 that the service provider possesses. The item "Treatment ID" is as described above. The item "User Treatment" shows the contents of the user treatments associated with the respective treatments.

For example, to provide no special treatment is defined as the content of the response with respect to the treatment ID "00". Similarly, treatment that involves imposing a penalty on the user is defined with respect to the treatment ID "01". For example, treatment such as adding a surcharge to the rental fee or reducing points that are assigned to the user is performed. In this case, the term "points" refers to points that are assigned to the respective users, and upon a user accumulating a certain number of points, a discount coupon to be used for subsequent transactions may be issued to the user or a free gift or the like may be given to the user. Treatment that involves assigning a special privilege to the user is defined with respect to the treatment ID "02". For example, the treatment may be to discount the rental fee or increase the number of points that are assigned. Treatment that involves imposing a usage restriction for subsequent transactions is defined with respect to the treatment ID "03". For example, the treatment may be to restrict the type of electric power supply apparatus 3 that can be rented or the rental time period, or to prohibit the user from renting an electric power supply apparatus 3 for a fixed period. Treatment that involves providing the user with information such as information relating to the method of use for the relevant connected device is defined with respect to the treatment ID "04".

According to the present embodiment, the aforementioned user treatment is determined according to the kind or usage method of the electrical device that the user connected (hereinafter, referred to as "connected device") to the electric power supply apparatus 3. For example, in a case where the electric power supply apparatus 3 is utilized with a predetermined electrical device (hereinafter, referred to as "designated device") or in accordance with a predetermined usage method, some type of special privilege is assigned to the relevant user, while in a case where the electric power supply apparatus 3 is utilized with an electrical device other than a designated device or by a usage method other than a designated usage method, some type of penalty is imposed on the relevant user or some type of information is provided to the relevant user.

<Processing of Electric Power Supply Apparatus 3>

Hereunder, an example of processing in the rental system 1 will be described. First, referring to FIG. 5, an example of processing that measures and stores the usage circumstances with respect to the electric power supply apparatus 3 will be described. The processing described hereunder is implemented by, for example, the processing unit 31 reading a control program that is stored in advance on the ROM or HDD of the storage unit 32 to the RAM and executing the control program. When an operation for discharging or charging is started at the electric power supply apparatus 3, the processing in S1 is executed. Note that, the electric power supply apparatus 3 is activated by the engine generator 38 starting up and generating electric power. The engine generator 38, for example, is started up upon the user performing a start-up operation.

In S1, the processing unit 31 determines whether or not electric power is being supplied to the electrical device 6 (the electrical device is "ON"). If electric power is being supplied, the processing unit 31 proceeds to S2, and if not the processing unit 31 proceeds to S9. In S2, the processing unit 31 uses the measurement circuit 393 to measure the supplied power, and in S3 the processing unit 31 stores the measurement result (date and time of discharge and waveform information) in the storage unit 32. That is, the information 321 to 323 shown in FIG. 4 is stored at this time. Further, information that identifies whether the electric power that was used was generated by the engine generator 38 or was electric power that was stored in the storage battery 40 may be included in the measurement result. Next, in S4, the processing unit 31 transmits the measurement result stored in the storage unit 32 to the information processing apparatus 2 through the communication network 5 together with other parameters. In this case, the other parameters include, for example, information regarding the current position detected by the GPS sensor 34, information relating to the electric power supply apparatus 3, and information relating to the electrical device 6 that is connected. Note that, it is desirable that the transmission in S4 is performed at fixed intervals. Since the communication load will increase if measurement results are always transmitted in real time, it is assumed that the transmission is performed intermittently. Note that, with respect to the interval, in order to display a warning screen or the like that is described later, the interval may be set to a short period when the electric power supply apparatus 3 is activated or when a new load is connected, and may be set to a longer period when the electric power supply apparatus 3 transitions to a steady state. Further, a configuration may also be adopted so that transmission of stored information is performed after the supply of electric power to the relevant connected device is stopped after the electric power supply apparatus 3 transitioned to a steady state.

Next, in S5, the processing unit 31 receives response information from the information processing apparatus 2. Although the details of the response information will be described later, the response information includes at least information regarding the type of the electrical device 6 which is estimated by the information processing apparatus 2. Next, in S6, the processing unit 31 determines whether or not the electrical device 6 that is connected is a designated device, based on the information regarding the type of the electrical device 6 which is included in the received response information. If the connected electrical device 6 is a designated device, the processing unit 31 proceeds to S8, and if not, proceeds to S7. Here, the term "designated device" refers to a predetermined electrical device that is a connected device with respect to which the relevant electric power supply apparatus 3 can stably operate. Information that indicates whether or not the relevant electrical device 6 is a designated device may be held in the electric power supply apparatus 3 also, or may be held only by the information processing apparatus 2. In a case where only the information processing apparatus 2 holds such information, information indicating whether or not the relevant electrical device 6 is a designated device is included in the response information that is received in S5. The information in question may also be warning information that is described later.

Figure 8:
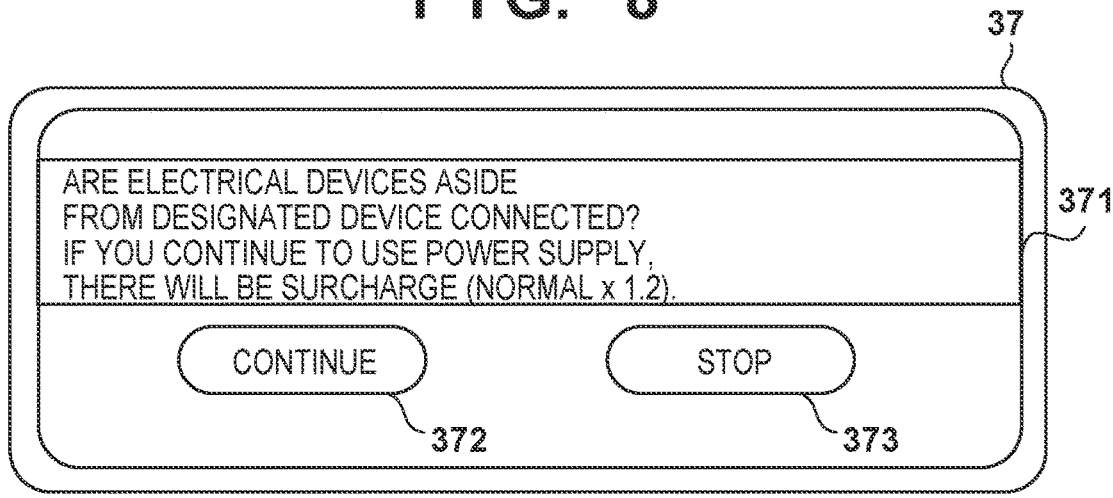
FIG. 8 is a view illustrating an example of a display on a display apparatus 37 of the portable electric power supply apparatus.

In S7, in order to warn the user that a device other than a designated device is connected, the processing unit 31 displays a warning screen on the display apparatus 37 in accordance with the information included in the response information described above. That is, the screen information for a warning screen is also included in the response information. An example of the warning screen is illustrated in FIG. 8. As illustrated in FIG. 8, on a warning screen 371, a message indicating that a penalty will be imposed because an electrical device other than a designated device is connected is displayed, and together with the message, buttons 372 and 373 are displayed that allow the user to select whether or not to continue to supply electric power to the connected device in question. The button 372 is a button for instructing the electric power supply apparatus 3 to continue to supply electric power, and the button 373 is a button for instructing the electric power supply apparatus 3 to stop supplying electric power. If the user inputs an instruction to continue supplying electric power, for example, a rental fee that is a surcharge of 1.2 times relative to the standard fee is added with respect to the amount of discharge during use. Note that, although in this case processing is described that corresponds to an electrical device with a load of a level which the electric power supply apparatus 3 is capable of supporting even if the electrical device is not a designated device, for example, in the case of a connected device which would significantly accelerate the deterioration of the storage battery 40 or various components, control may be performed to display a warning screen and, together therewith, to stop the supply of electric power. In such a case, it is desirable to display a message indicating that the supply of electric power was stopped as well as the reason for stopping the supply of electric power on the display apparatus 37. When the processing in S7 ends, the processing unit 31 proceeds to S8.

On the other hand, if it is determined in S1 that power is not being supplied, in S9 the processing unit 31 determines whether or not charging of the storage battery 40 is being performed by the engine generator 38. If charging is being performed, the processing unit 31 proceeds to S10, and if not the processing unit 31 ends the present processing flow. In S10, the processing unit 31 performs measurement of the charging by means of the charging circuit 397. In S11, the processing unit 31 stores the charging result (charging date and time and charged amount) in the storage unit 32, and then proceeds to S8. That is, the information 322 illustrated in FIG. 4 is stored at this time. The measurement in question may be performed by the charging circuit 397 itself, or may be performed by the measurement circuit 393. Alternatively, a dedicated measurement circuit may be separately provided. Further, although an example in which the charging result is stored only in the storage unit 32 has been described here, the relevant charging result may also be transmitted through the communication network 5 to the information processing apparatus 2, in the same manner as the measurement result is transmitted in S4. By this means, the information processing apparatus 2 can acquire the measurement result and the charging result as usage circumstances of the electric power supply apparatus 3, that is, can acquire information according to charging/discharging. Hence, the information processing apparatus 2 can identify the usage method of the user based on the relevant charging/discharging information, and can implement more detailed user treatment. For example, in a case where charging is repeated more than necessary, the information processing apparatus 2 may be configured to determine that the electric power supply apparatus 3 is being used according to a usage method that violates the terms of use with respect to the electric power supply apparatus 3, and to impose a penalty on the user.

In S8, the processing unit 31 determines whether or not the operation to supply electric power or the charging operation has ended. If the operation has not ended, the processing unit 31 returns the processing to S1, while if the operation has ended, the processing unit 31 ends the present processing flow.

<Processing of Information Processing Apparatus 2>

Next, an example of processing of the information processing apparatus 2 will be described referring to FIG. 6. The processing described hereunder is implemented by, for example, the processing unit 21 reading a control program that is stored in advance on the ROM or HDD of the storage unit 22 to the RAM and executing the control program. Note that, in the present flowchart it is assumed that the charging result stored in S11 is also transmitted in addition to the measurement result that is transmitted from the electric power supply apparatus 3 in S4. In a case where the charging result is not transmitted, the processing in S23 that is described hereunder is skipped.

In S21, the processing unit 21 receives the measurement result and charging result (information relating to the usage circumstances) that are transmitted by the electric power supply apparatus 3 in S4. As mentioned above, the measurement result includes at least the discharging date and time, waveform information, and the discharge source (the engine generator 38 or the storage battery 40). The charging result includes at least the charging date and time and the charged amount. Next, in S22, the processing unit 21 calculates feature values based on the received measurement result, and compares the calculation result with a feature value map of the database 26 to estimate the type of electrical device 6 that is connected to the electric power supply apparatus 3. In a case where a feature value map that matches the result for comparison does not exist, the processing unit 21 determines that the connected device is a device other than a designated device, and updates the database 24 on the assumption that a new type of electrical device is connected.

Next, in S23, the processing unit 21 analyzes the charging/discharging at the electric power supply apparatus 3, based on the charging result and measurement result transmitted from the electric power supply apparatus 3. In this case, for example, the processing unit 21 counts the number of times that charging and discharging were performed based on the aforementioned two items of information, and generates charging/discharging information that includes the count information. Note that, the processing unit 21 may analyze other parameters associated with charging/discharging, and generate the obtained results as charging/discharging information. Next, in S24, the processing unit 21 executes user treatment processing. The user treatment processing is processing for determining the treatment with respect to the user based on the electrical device estimated in S22 and the charging/discharging information generated in S23. The detailed procedure is described later using FIG. 7.

Next, in S25, the processing unit 21 calculates the current rental fee based on the waveform information received in S21 and the user treatment determined in S24. Although the rental fee fundamentally increases in proportion to the electric power supply amount, a surcharge or discount is set according to the user treatment that is determined in accordance with whether or not a designated connected device or usage method is used, and is calculated using these items of information.

Next, in S26, the processing unit 21 transmits response information to respond to the information received in S21 to the electric power supply apparatus 3. At least the type of electrical device estimated in S22, information regarding the user treatment determined in S24, and the rental fee calculated in S25 are included in the response information, and the aforementioned warning information or the like is included in the information regarding the user treatment. Next, in S27, the processing unit 21 updates the database 24 based on these items of information, and then ends the present processing flow.

<User Treatment Processing>

Figure 7:
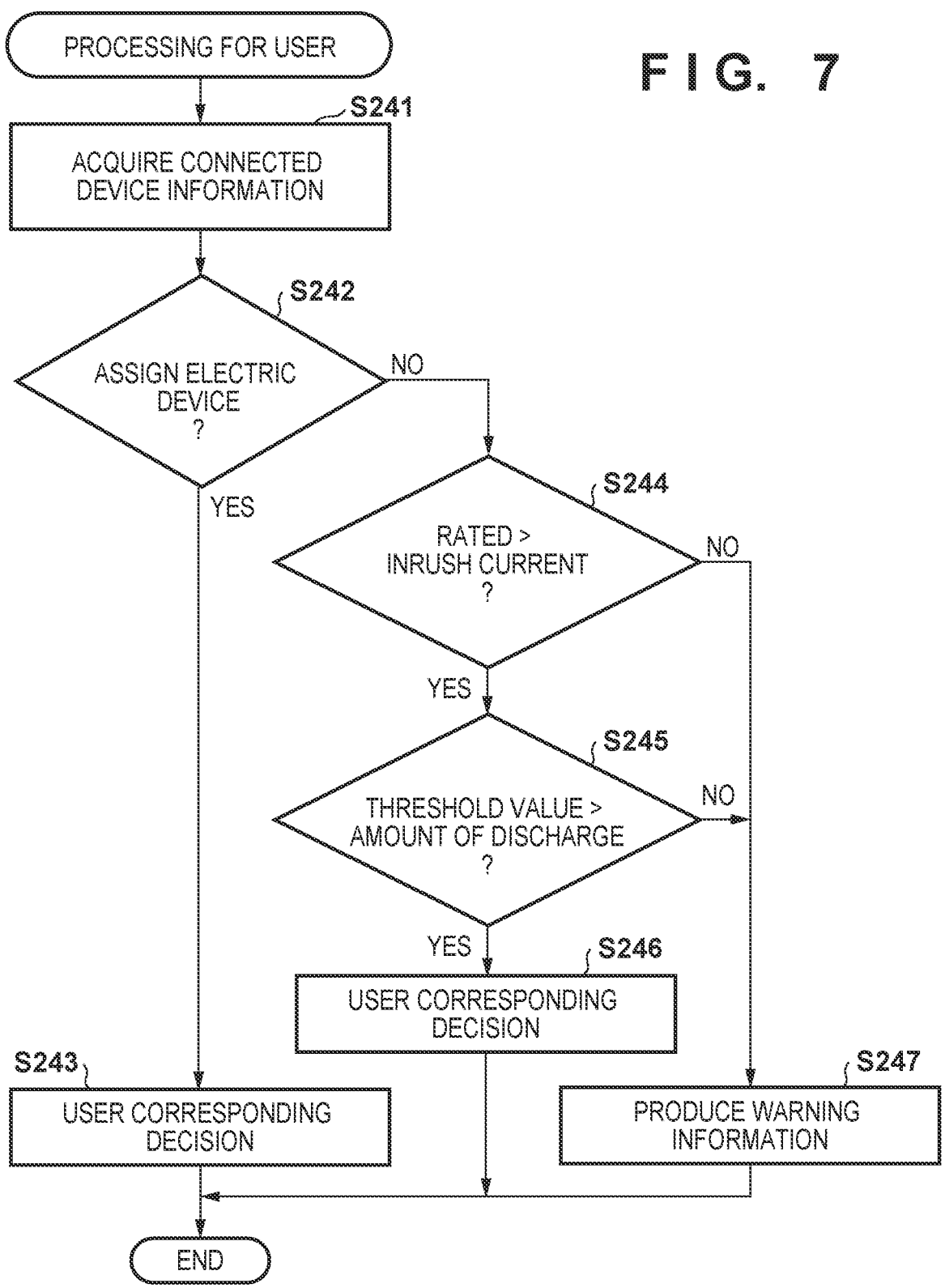
FIG. 7 is a flowchart illustrating an example of processing executed as user treatment processing by the information processing apparatus.

Next, the details of the user treatment processing executed in the aforementioned S24 in the information processing apparatus 2 will be described referring to FIG. 7. The processing described hereunder is implemented by, for example, the processing unit 21 reading a control program that is stored in advance on the ROM or HDD of the storage unit 22 to the RAM and executing the control program.

In S241, the processing unit 21 acquires information (connected device information) according to the connected electrical device that is estimated in S22. Note that, the term "acquires" used here indicates that, for example, the processing unit 21 stores the estimated information in S22 in the RAM of the storage unit 22 or the like, and refers to the stored information. Subsequently, in S242, the processing unit 21 determines whether or not the electrical device that is indicated by the acquired connected device information is a designated device. With respect to aforementioned determination, the processing unit 21 may compare the acquired connected device information with information of the database 24, and determine that the connected device is a designated device if a matching electrical device is registered in the database 24, or may determine that the connected device is a designated device if a matching electrical device is registered in the database 24 and information indicating a designated device is defined in association therewith. If the connected device is a designated device, the processing unit 21 proceeds to S243, and if not, the processing unit 21 proceeds to S244.

Figure 10:
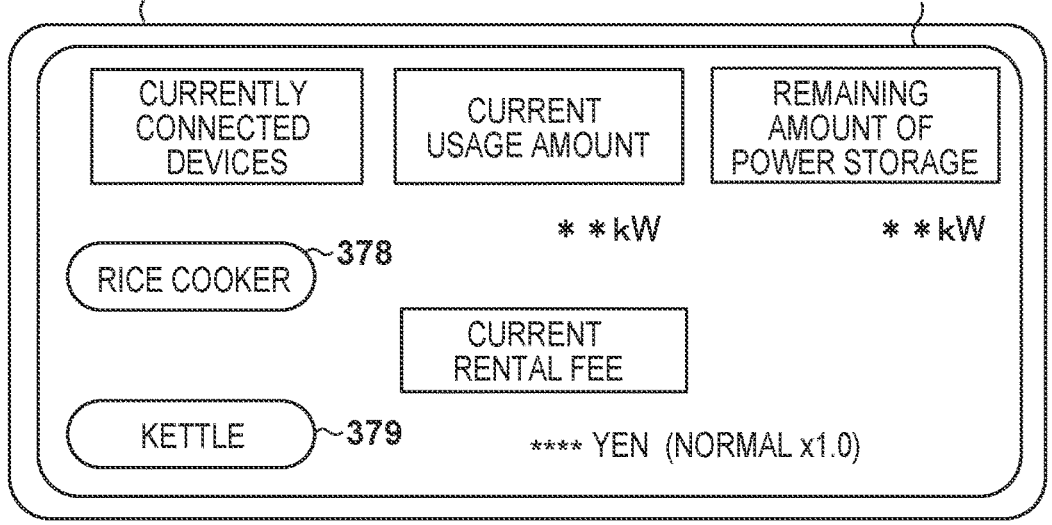
FIG. 10 is a view illustrating an example of a display on the display apparatus 37 of the portable electric power supply apparatus.

In S243, the processing unit 21 decides on the user treatment processing to adopt based on information (treatment ID and user treatment) of the databases 24 and 25, and ends the present processing flow. The user treatment in this case may be, for example, because the connected device is a designated device, to grant a discount to the user as a special privilege if the connected device is an electrical device that is appropriate for the relevant electric power supply apparatus 3, or may be to provide the user with guidance information showing the optimal usage method for a designated device, for example, a usage method that suppresses electric power consumption. Alternatively, the processing unit 21 may decide that no treatment is necessary. In the case of S243, the processing unit 21 may generate screen information for generating a screen illustrated in FIG. 10 as information that is included in response information transmitted to the electric power supply apparatus 3. FIG. 10 illustrates one example of a screen that is displayed on the display apparatus 37 when the electric power supply apparatus 3 is operating. The screen information of a screen 377 that is the screen in question may be included in response information that is generated by the information processing apparatus 2 and transmitted to the electric power supply apparatus 3 in S26, or may be generated by the electric power supply apparatus 3 using the response information.

The screen 377 can be constituted by including buttons 378 and 379 showing the currently connected devices, the current amount of used electric power, the current rental fee, and the residual capacity. Note that, the present invention is not limited to this screen configuration, and the screen may be constituted by adding other various kinds of information. When the button 378 or button 379 is selected, information according to the relevant connected device is displayed (not illustrated in the drawings). For example, the aforementioned guidance information that shows the method for using the relevant connected device may be displayed. The screen 377 is preferably updated each time response information is received from the information processing apparatus 2.

The description will now return to FIG. 7. In S244, if, on the other hand, the connected device is not a designated device, based on the waveform information received in S21, the processing unit 21 identifies the inrush current during start-up of the relevant device, and determines whether or not the identified inrush current is less than the rated current of the electric power supply apparatus 3. If the inrush current is less than the rated current, the processing unit 21 proceeds to S245, while if the inrush current is equal to or greater than the rated current the processing unit 21 proceeds to S247. In S245, the processing unit 21 determines the amount of discharge in a predetermined time unit based on the waveform information received up to the current time, and determines whether or not the determined amount of discharge is less than a threshold value. In this case, the processing unit 21 makes a determination by taking the amount of discharge within a predetermined time unit as criterion for the determination, and the reason for doing so is that, for example, if a connected electrical device is of a kind with respect to which output of a high current continues, the influence on the electric power supply apparatus 3 will be significant, and therefore the processing unit 21 performs the aforementioned determination in order to distinguish whether the connected electrical device is such type of an electrical device. If the amount of discharge is less than the threshold value, the processing unit 21 proceeds to S246, and if the amount of discharge is equal to or greater than the threshold value, the processing unit 21 proceeds to S247.

Figure 9:
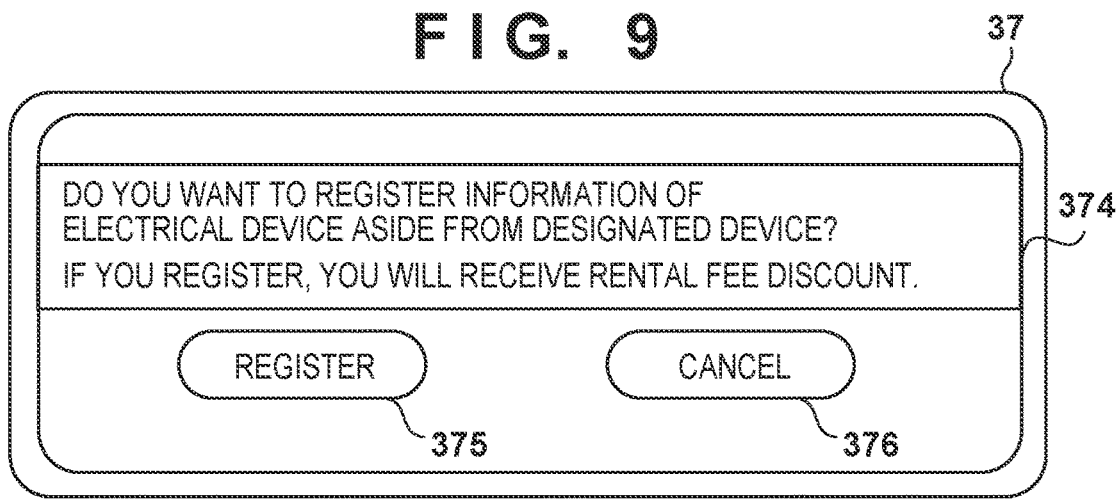
FIG. 9 is a view illustrating an example of a display on the display apparatus 37 of the portable electric power supply apparatus.

In S246, although the connected device is not a designated device, the processing unit 21 determines that the connected device is an electrical device for which the electric power consumption is equal to the electric power consumption of a designated device, and the processing unit 21 decides on a user treatment and ends the present processing flow. The user treatment in this case, for example, may be control so as to display a registration screen 374 as illustrated in FIG. 9 on the display apparatus 37 and acquire information relating to the connected device from the user. The registration screen 374 is constituted by including a message that prompts a user to register information according to an electrical device other than a designated device, and a registration button 375 and a cancel button 376. If the registration button 375 is pressed, the display transitions to an input screen (not illustrated) for inputting detailed registration information. It is desirable that information of the input screen is also provided from the information processing apparatus 2 to the electric power supply apparatus 3. The registration information is, for example, various kinds of information according to the relevant electrical device, such as product information (specifications), product name, and manufacturer. Note that, in order to input such information, because it may be troublesome to input the information using the user interface of the electric power supply apparatus 3, for example, at the timing at which the registration button 375 is pressed, a two-dimensional bar code including URL information may be displayed. In this case, the user of the electric power supply apparatus 3 can scan the two-dimensional bar code displayed on the display apparatus 37 using a smartphone or the like that the user possesses, and can access the URL to connect to the registration screen. By this means, it is possible for the user to input the registration information using a device having a user interface with a higher level of functionality than the user interface of the electric power supply apparatus 3, and thus a more user-friendly operation system can be provided.

On the other hand, if the processing unit 21 determines that the connected device is not a designated device and is an electrical device for which electric power consumption is performed in a manner that hastens deterioration of the storage battery 40, in S247 the processing unit 21 creates warning information and then ends the present processing flow. The warning information is screen information for generating the warning screen illustrated in FIG. 8 that is described above. Further, together with the warning information, the processing unit 21 decides on a user treatment that imposes a penalty as the user treatment. The user treatment in this case is, for example, imposing a surcharge, or imposing a usage restriction for subsequent transactions.

Figure 6:
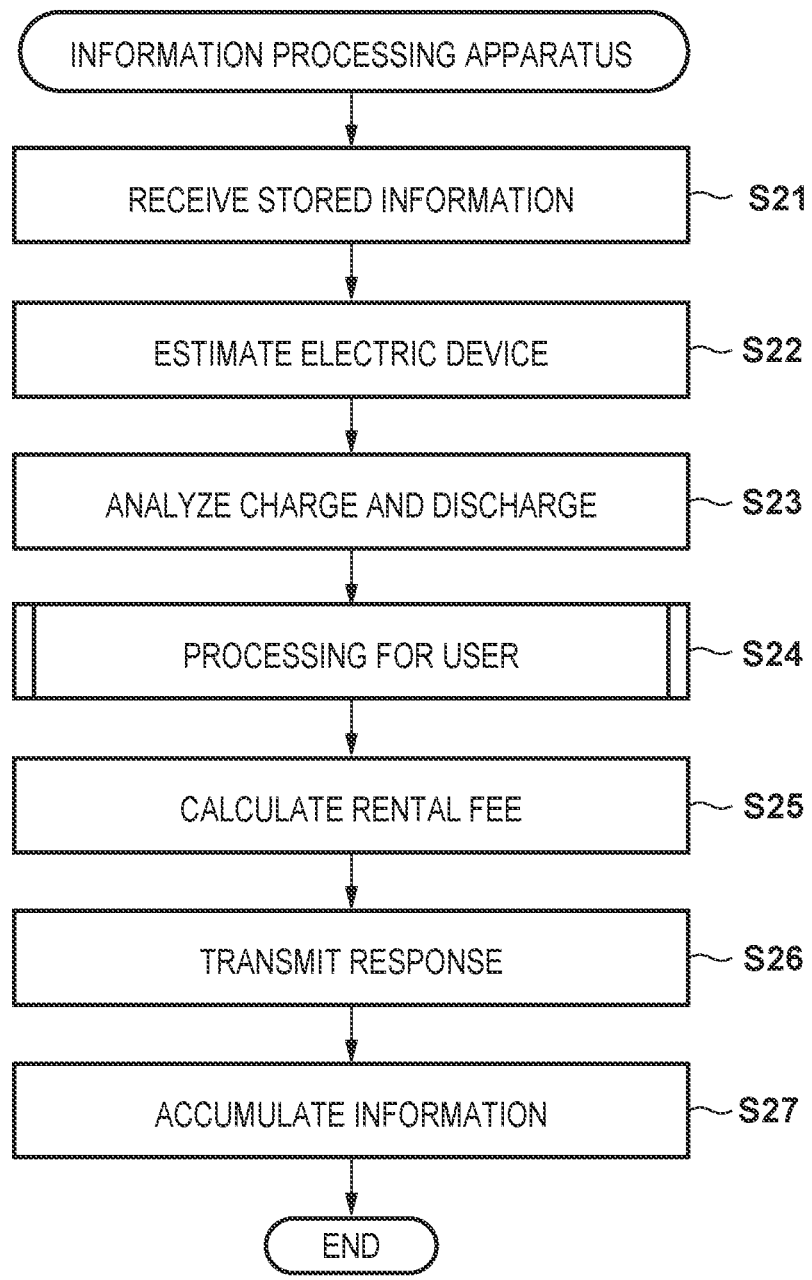
FIG. 6 is a flowchart illustrating an example of processing executed by the information processing apparatus.

Note that, the information generated in S243, S246 and S247 and the decision information or the like is transmitted to the electric power supply apparatus 3 in S26 of FIG. 6, and is also stored in the database 24 or the like of the information processing apparatus 2 in S27. With regard to information relating to user treatment, it is desirable that the information is stored in the storage unit 32 together with an identifier that identifies the user. These items of information are provided to the terminal 4 at the timing at which the electric power supply apparatus 3 is returned, and the treatment with respect to the user as well as charging of the rental fee are performed.

Figure 5:
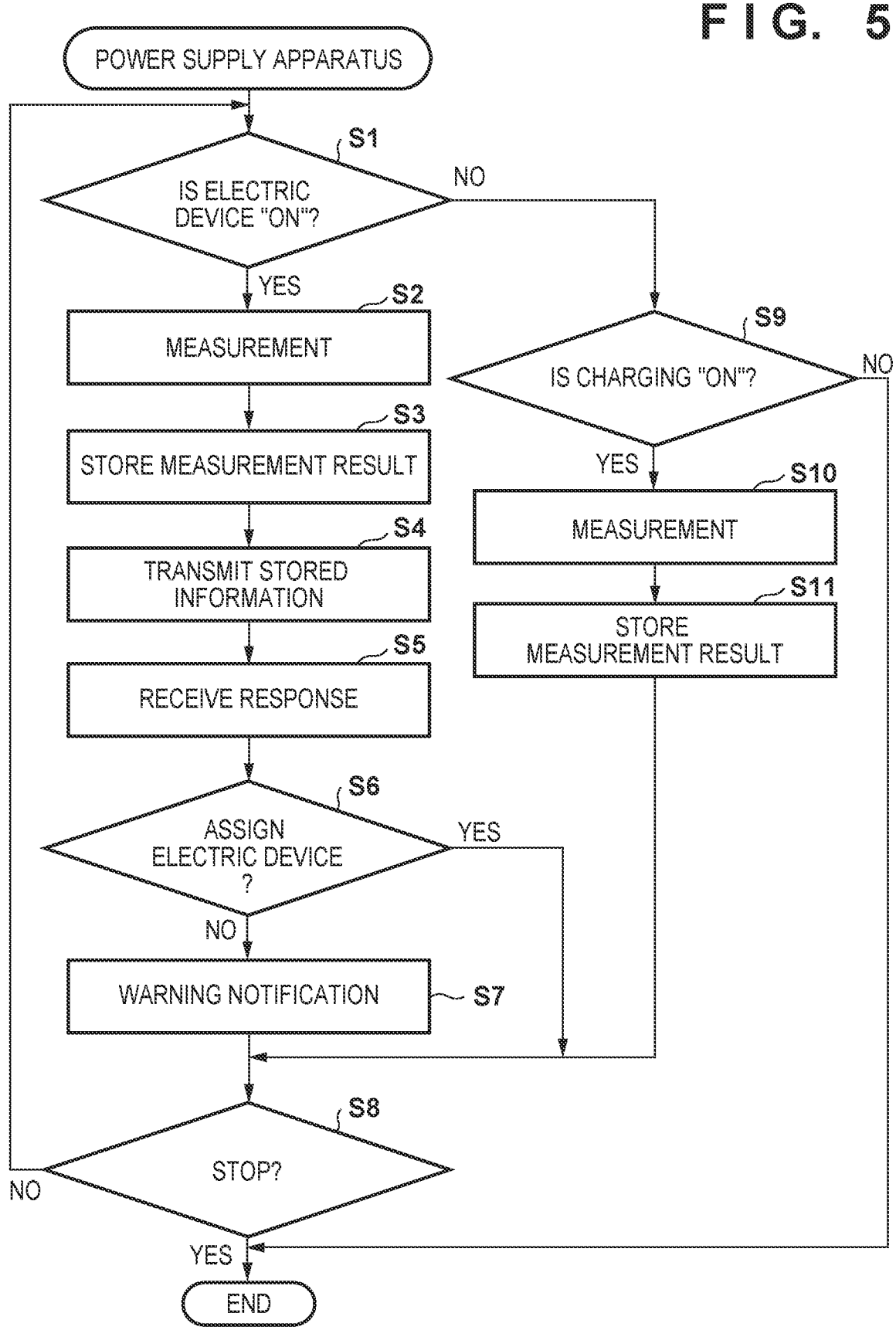
FIG. 5 is a flowchart illustrating an example of processing executed by the portable electric power supply apparatus.

Further, in a case of displaying the registration screen illustrated in FIG. 9 or the screen illustrated in FIG. 10 on the display apparatus 37, control may be performed so as to change S6 of the flowchart in FIG. 5 so as to determine whether or not to update the displayed screen, and if it is determined that the screen is to be updated, to proceed to S7 and display one of the screens of FIG. 8 to FIG. 10.

As described above, the rental system according to the present embodiment is constituted by including a portable electric power supply apparatus supplying electric power to a detachably connected electrical device, an information processing apparatus managing usage circumstances of the portable electric power supply apparatus at a rental destination, and a terminal which is possessed by a service provider that rents out the portable electric power supply apparatus. The information processing apparatus acquires information according to the usage circumstances of the portable electric power supply apparatus, estimates the type of electrical device that is connected based on a measurement result with respect to a voltage and a current when the portable electric power supply apparatus supplied electric power that is included in the information according to the usage circumstances, determines whether or not the estimated electrical device is a predetermined designated device, and in accordance with the determination result, decides on a user treatment with respect to the user that rented the portable electric power supply apparatus. Hence, according to the present embodiment, usage circumstances of a portable electric power supply apparatus at a rental destination can be suitably acquired, and a treatment with respect to a user can be controlled according to whether or not the portable electric power supply apparatus was used appropriately.

Second Embodiment

A second embodiment of the present invention is described hereunder. In the above first embodiment, an example was described in which, fundamentally, sending and receiving of information is performed by communication between the electric power supply apparatus 3 and the information processing apparatus 2 that is a management server. Note that, in a case where a communication function is provided in the electric power supply apparatus 3, the influence on the production cost and power consumption and the like of the apparatus is significant, and in addition, because the electric power supply apparatus 3 is a portable type, situations may arise in which the electric power supply apparatus 3 is used at a location that is outside the communication range with respect to radio communication. If communication cannot be performed, the fine control described above cannot be performed. Therefore, to solve this problem, in the present embodiment a rental system 901 in a case where a portable electric power supply apparatus is not equipped with a communication function will be described.

<System Configuration>

Figure 11:
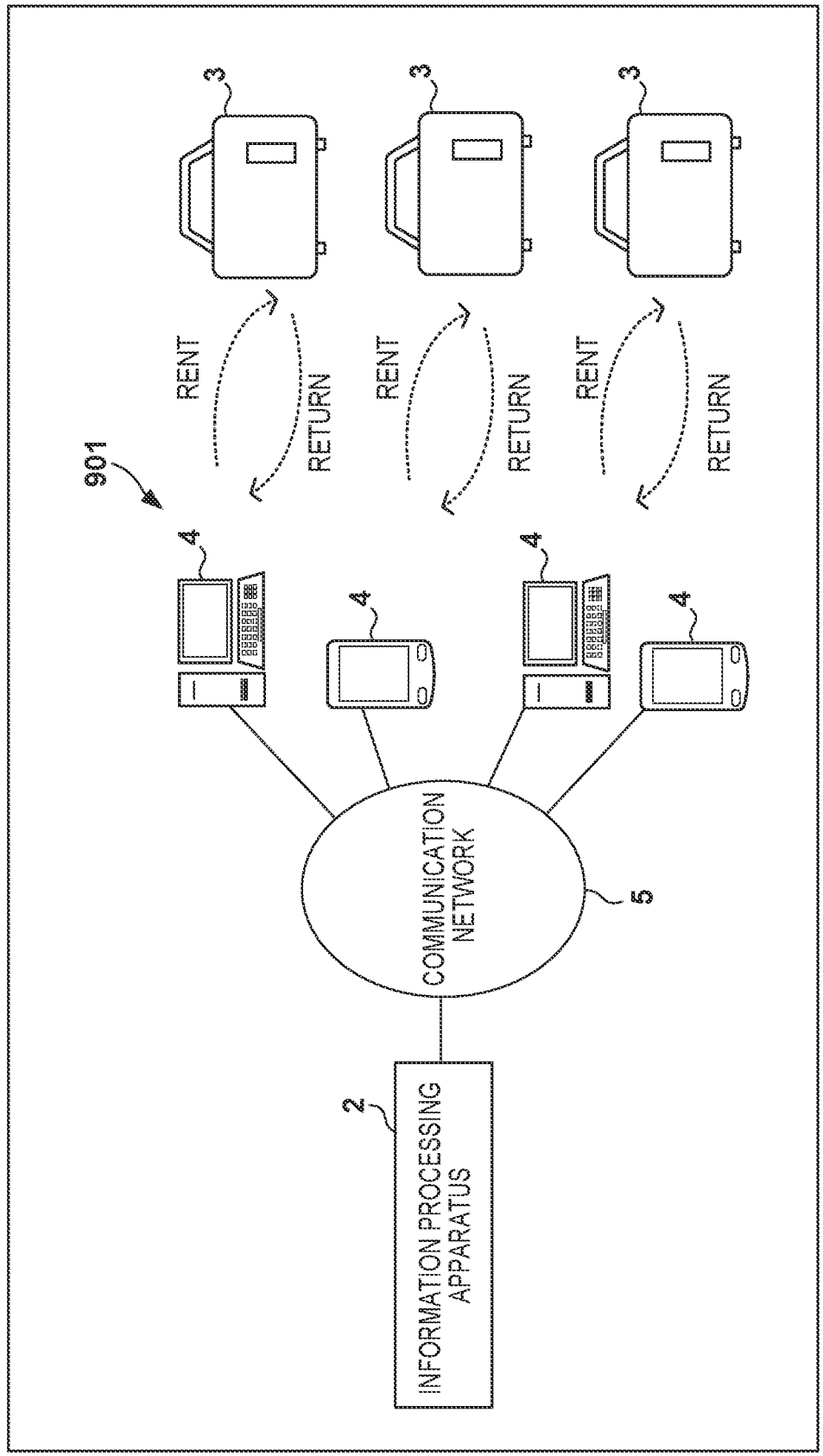
FIG. 11 is a schematic diagram of a rental system according to one embodiment of the present invention.

FIG. 11 is a schematic diagram of the rental system 901. A description of the configuration and control of the rental system 901 that are the same as in the foregoing first embodiment will be omitted here. As illustrated in FIG. 11, in the rental system 901, the information processing apparatus 2 and a plurality of the terminals 4 are communicably connected through the communication network 5. On the other hand, unlike the above first embodiment, because the plurality of electric power supply apparatuses 3 do not have a communication function, the usage circumstances of an electric power supply apparatus 3 that was rented from a service provider is not known until the electric power supply apparatus 3 is returned to the relevant service provider. Therefore, at the timing at which the electric power supply apparatus 3 is returned, information stored in the electric power supply apparatus 3 is read, and is transferred from the terminal 4 to the information processing apparatus 2.

<Portable Electric Power Supply Apparatus>

Figure 12:
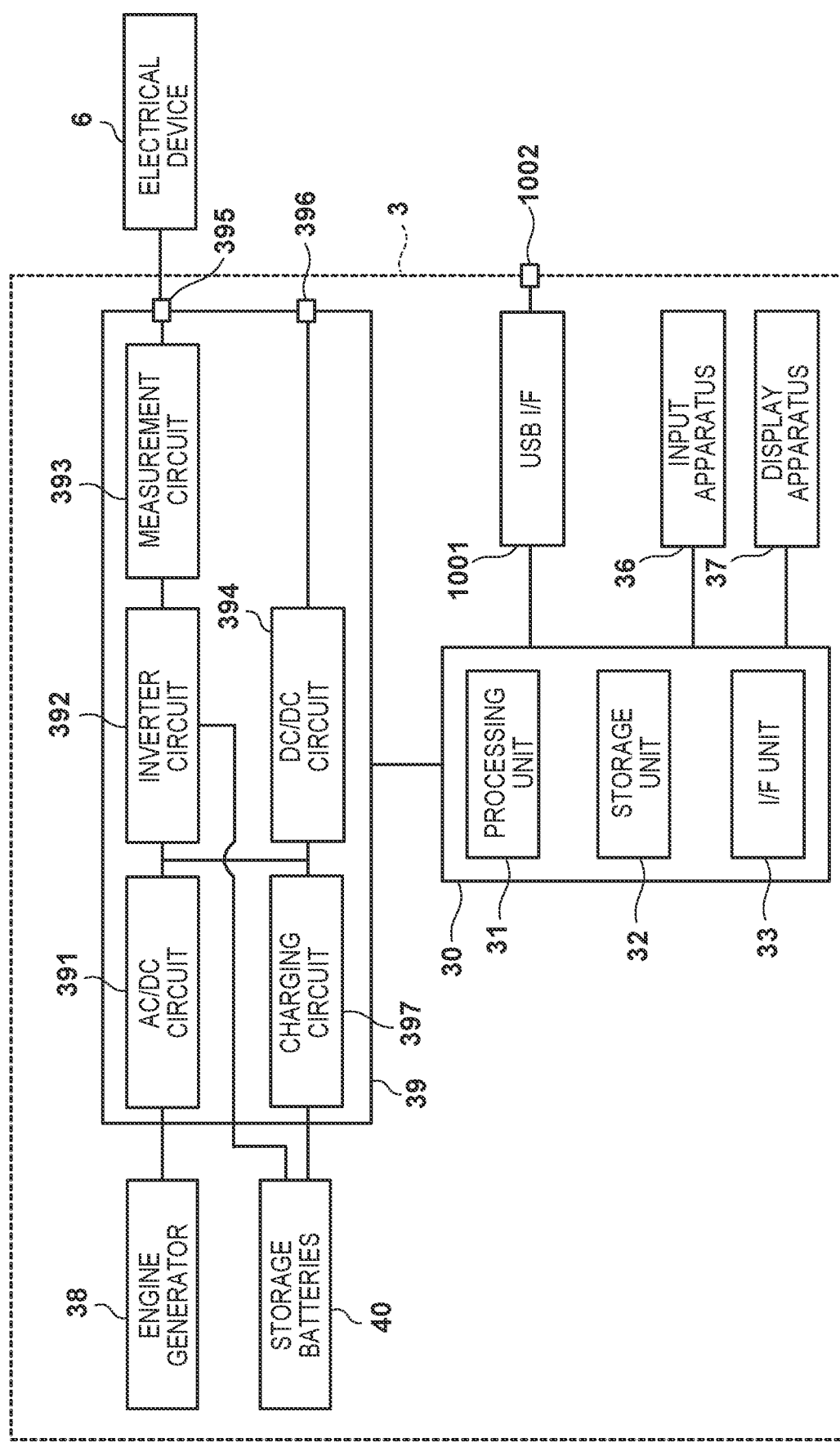
FIG. 12 is a block diagram of a portable electric power supply apparatus according to one embodiment of the present invention.

FIG. 12 is a block diagram of the electric power supply apparatus 3. The electric power supply apparatus 3 of the present embodiment is equipped with a USB I/F 1001 and a connector 1002 instead of the GPS sensor 34 and the communication apparatus 35 that are provided in the above first embodiment. The remaining configuration is the same as in the above first embodiment, and hence a detailed description thereof will be omitted here.

A USB cable is connected to the connector 1002, and information stored in the storage unit 32 can be read through the USB I/F 1001. When the electric power supply apparatus 3 is returned to the service provider, the terminal 4 and the electric power supply apparatus 3 are connected using the USB cable, and information accumulated in the storage unit 32 is read to the terminal 4. The read information is transferred to the information processing apparatus 2.

The information processing apparatus 2 according to the present embodiment executes basically the same processing as in the flowchart illustrated in FIG. 6. The portions of the processing which differ from the flowchart illustrated in FIG. 6 are that stored information which was transferred from the terminal 4 is received in S21, and that a response transmission is transmitted to the terminal 4 in S26. Note that, in the present embodiment, because the processing is executed after the electric power supply apparatus 3 is returned, the screen information and the like illustrated in FIG. 8 to FIG. 10 is not generated. That is, with respect to the flowchart illustrated in FIG. 7, only the user treatment is decided on in accordance with the stored information, and screen information such as a warning screen is not generated.

As described above, in the rental system according to the present embodiment, the portable electric power supply apparatus includes a USB interface. Further, information according to the usage circumstances that is stored in the portable electric power supply apparatus is read through the USB interface to the terminal of the service provider that rented out the portable electric power supply apparatus, when the relevant portable electric power supply apparatus is returned. The information processing apparatus receives the stored information through a network from the terminal after the portable electric power supply apparatus is returned to the service provider. According to the present embodiment, an inexpensive electric power supply apparatus 3 can be provided, and because user treatment is adopted that is in accordance with an electrical device used, a rental fee and the like can be precisely calculated.

Other Embodiments

<Other Examples of Configuration of Electric Power Supply Apparatus>

Figure 13:
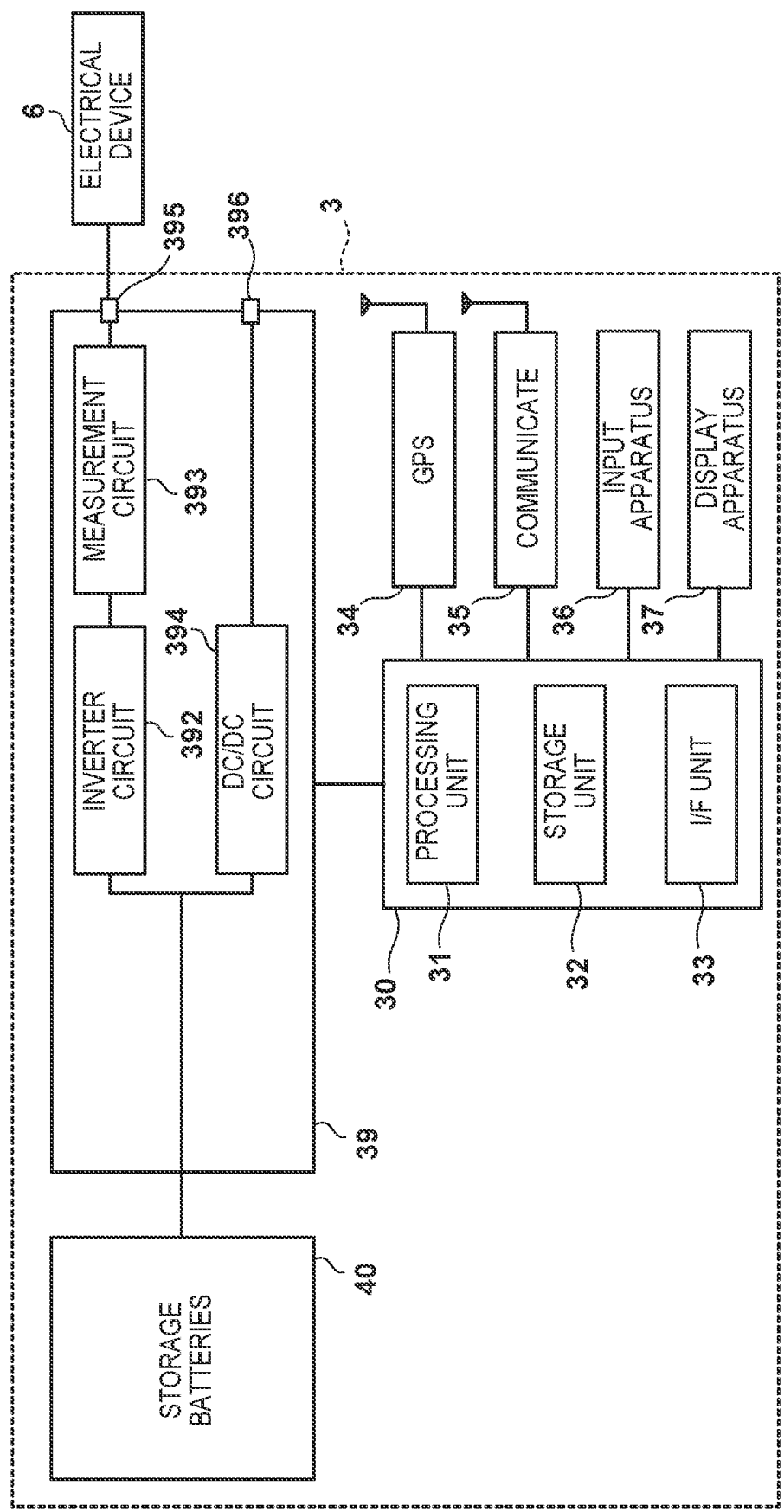
FIG. 13 is a block diagram of a portable electric power supply apparatus according to a different example.

Although in the foregoing embodiments the electric power supply apparatus 3 illustrated in FIG. 2 is configured to include the engine generator 38 and the storage battery 40, the present invention is not limited thereto. FIG. 13 illustrates an electric power supply apparatus 3 for which a configuration is adopted that does not include the engine generator 38, and is only equipped with the storage battery 40. In the configuration in FIG. 13, because the electric power supply apparatus 3 does not have the engine generator 38, charging with respect to the storage battery 40 is performed from an external power source. Further, FIG. 14 illustrates an electric power supply apparatus 3 for which a configuration is adopted that does not include the storage battery 40, and is only equipped with the engine generator 38. Note that, the respective processing operations do not differ from the foregoing embodiments, and hence a description of the processing will be omitted here. Note that, similarly to the above second embodiment, a configuration may be adopted that is equipped with the USB I/F 1101 instead of the GPS sensor 34 and the communication apparatus 35.

Summary of Embodiments

1. An information processing apparatus (for example, 2) of the above embodiments that manages the usage circumstances at a rental destination of a portable electric power supply apparatus (for example, 3) supplying electric power to a detachably connected electrical device includes:

an acquisition unit (for example, 23, S21) configured to acquire information according to the usage circumstances of the portable electric power supply apparatus;

an estimation unit (for example, 21, S22) configured to estimate a type of an electrical device that is connected, based on a measurement result with respect to a voltage and a current when the portable electric power supply apparatus supplied electric power that is included in the information according to the usage circumstances;

a determination unit (for example, 21, S241) configured to determine whether or not an electrical device that is estimated by the estimation unit is a predetermined designated device; and a decision unit (for example, 21, S243, S246, S247) configured to decide on a user treatment with respect to a user that rented the portable electric power supply apparatus, in accordance with a determination result obtained by the determination unit.

According to this embodiment, a treatment that is adopted with respect to a user can be varied in accordance with whether or not an appropriate electrical device was utilized, and the user can thus be encouraged to appropriately utilize the electric power supply apparatus. By this means, deterioration of the portable electric power supply apparatus can be suppressed as much as possible.

2. In the above-mentioned embodiment,
  the portable electric power supply apparatus comprises a communication unit (for example, 35) configured to perform radio communication with the information processing apparatus, and
  the acquisition unit receives the information according to the usage circumstances that is transmitted through the communication unit from the portable electric power supply apparatus during a period in which the portable electric power supply apparatus is supplying electric power.

According to this embodiment, when the portable electric power supply apparatus is supplying electric power, information according to the usage circumstances can be acquired in real time, and thus more dynamic treatment can be adopted with respect to a user.

3. The information processing apparatus of the above-mentioned embodiment further comprises:
  a notification unit (for example, 23, S26) for, in a case where the determination result indicates that the estimated electrical device is not the designated device, notify warning information indicating that the estimated electrical device is not the designated device to the portable electric power supply apparatus.

According to this embodiment, notification of a warning to the user can be performed in real time, and usage that results in an overload of the portable electric power supply apparatus can be restricted in real time.

4. In the above-mentioned embodiment,
  the warning information includes screen information of a warning screen that is displayed on a display apparatus provided in the portable electric power supply apparatus, and
  information indicating that a penalty will be imposed is displayed on the warning screen, and a choice regarding whether to continue supplying electric power or stop supplying electric power to the estimated electrical device is displayed in a selectable manner on the warning screen (for example, FIG. 8).

According to this embodiment, even in a case where an electrical device other than a designated device is connected, the user can select whether or not to continue to use the portable electric power supply apparatus, and thus control that takes into consideration the intention of the user can be carried out, and there is the effect that the occurrence of trouble concerning the user when the portable electric power supply apparatus is returned is suppressed by notifying the user in advance indicating that a penalty will be imposed.

5. In the above-mentioned embodiment,
  in a case where the determination result indicates that the estimated electrical device is not the designated device, and which is a case where it is indicated that an inrush current of the portable electric power supply apparatus is less than a rated current of the portable electric power supply apparatus and an amount of discharge in a predetermined time unit is less than a predetermined threshold value, the notification unit notifies screen information of a registration screen for registering information relating to the estimated electrical device to the portable electric power supply apparatus (for example, FIG. 9).

According to this embodiment, even in a case where an electrical device other than a designated device is connected, if the connected device is of the same level as a designated device, information can be acquired from the user and registered, and a database of the information processing apparatus can be updated so that the information can be utilized for subsequent use. Further, with respect to the assistance from the user, a user treatment such as granting a special privilege to the user can be adopted.

6. In the above-mentioned embodiment,
  instead of the screen information, the notification unit notifies information according to a registration URL for registering information relating to the estimated electrical device to the portable electric power supply apparatus.

According to this embodiment, it is possible for the user to input registration information using a device equipped with a user interface having a higher level of functionality than the user interface of the portable electric power supply apparatus, and thus a more user-friendly operation system can be provided.

7. In the above-mentioned embodiment,
  in a case where the determination result indicates that the estimated electrical device is the designated device, guidance information that provides guidance regarding an appropriate usage method of the designated device is notified to the portable electric power supply apparatus (for example, FIG. 10).

According to this embodiment, an appropriate usage method for a designated device that is based on information accumulated up to the current time can be notified to a user, and thus the user can implement a usage method that reduces the rental fee and, in addition, deterioration of the portable electric power supply apparatus can be suppressed.

8. In the above-mentioned embodiment,
  the portable electric power supply apparatus comprises a USB interface (for example, 1101);
  the information according to the usage circumstances that is stored in the portable electric power supply apparatus is read through the USB interface to a terminal of a service provider that rented out the portable electric power supply apparatus, when the portable electric power supply apparatus is returned; and
  after the portable electric power supply apparatus is returned to the service provider, the acquisition unit receives the information according to the usage circumstances through a network from the terminal.

According to this embodiment, the treatment that is adopted with respect to a user can be switched according to the connected electrical device, while keeping down the production cost of the portable electric power supply apparatus.

9. In the above-mentioned embodiment,
  in a case where the determination result indicates that the estimated electrical device is the designated device, the decision unit decides on a user treatment that grants a special privilege to the user, and
  in a case where the determination result indicates that the estimated electrical device is not the designated device, the decision unit decides on a user treatment that imposes a penalty on the user.

According to this embodiment, a user treatment can be switched as described above, and thus the user can be suitably encouraged to use the portable electric power supply apparatus in an appropriate manner.

10. In the above-mentioned embodiment,
  the user treatment that grants a special privilege to the user is a discount on a rental fee for the portable electric power supply apparatus, and
  the user treatment that imposes a penalty on the user is a surcharge on a rental fee for the portable electric power supply apparatus.

According to this embodiment, a user treatment can be switched as described above, and thus the user can be suitably encouraged to use the portable electric power supply apparatus in an appropriate manner.

11. The above-mentioned embodiment further comprises:
a calculation unit (for example, S25) configured to calculate a rental fee in accordance with a user treatment that is decided on by the decision unit, and the measurement result; and
a transmission unit (for example, S26) configured to transmit the rental fee that is calculated to a terminal of a service provider that rented out the portable electric power supply apparatus.

According to this embodiment, a rental fee calculated according to precise control can be notified to the service provider, and in this way the rental service of the service provider can be favorably assisted.

12. In the above-mentioned embodiment,
the portable electric power supply apparatus comprises a storage battery;
the determination unit further determines whether or not a usage method is within a predetermined range, based on a charging result showing charging information that is included in the information according to the usage circumstances, and the measurement result, and
the decision unit decides on a user treatment in accordance with a determination result obtained by the determination unit.

According to this embodiment, the user can be encouraged to use an appropriate usage method that relates to the number of charge and discharge cycles of the storage battery.

13. In the above-mentioned embodiment,
the portable electric power supply apparatus supplies electric power from at least one of an electric generator or a storage battery.

According to this embodiment, the present invention can be utilized in various forms, and restrictions due to the configuration can be suppressed and a free design can be allowed.

14. An information processing method for managing usage circumstances at a rental destination of a portable electric power supply apparatus supplying electric power to a detachably connected electrical device of the above-mentioned embodiment includes:
an information processing apparatus acquiring information according to the usage circumstances of the portable electric power supply apparatus;
the information processing apparatus estimating a type of an electrical device that is connected, based on a measurement result with respect to a voltage and a current when the portable electric power supply apparatus supplied electric power that is included in the information according to the usage circumstances;
the information processing apparatus determining whether or not an electrical device which is estimated by the estimating is a predetermined designated device; and
the information processing apparatus deciding on a user treatment with respect to a user that rented the portable electric power supply apparatus, in accordance with a determination result obtained by the determining.

According to this embodiment, a treatment that is adopted with respect to a user can be varied in accordance with whether or not an appropriate electrical device was utilized, and the user can thus be encouraged to appropriately utilize the electric power supply apparatus. By this means, deterioration of the portable electric power supply apparatus can be suppressed as much as possible.

15. A non-transitory computer-readable storage medium storing a program that operates in an information processing apparatus managing usage circumstances at a rental destination of a portable electric power supply apparatus supplying electric power to a detachably connected electrical device of the above-mentioned embodiment includes:
an acquisition step of the information processing apparatus acquiring information according to the usage circumstances of the portable electric power supply apparatus;
an estimation step of the information processing apparatus estimating a type of an electrical device that is connected, based on a measurement result with respect to a voltage and a current when the portable electric power supply apparatus supplied electric power that is included in the information according to the usage circumstances;
a determination step of the information processing apparatus determining whether or not an electrical device which is estimated in the estimation step is a predetermined designated device; and
a decision step of the information processing apparatus deciding on a user treatment with respect to a user that rented the portable electric power supply apparatus, in accordance with a determination result obtained in the determination step.

According to this embodiment, a treatment that is adopted with respect to a user can be varied in accordance with whether or not an appropriate electrical device was utilized, and the user can thus be encouraged to appropriately utilize the electric power supply apparatus. By this means, deterioration of the portable electric power supply apparatus can be suppressed as much as possible.

16. A portable electric power supply apparatus supplying electric power to a detachably connected electrical device of above-mentioned embodiment comprises:
at least one of an electric generator and a storage battery configured to supply electric power to the connected electrical device (for example, 38, 40);
a measurement unit configured to measure a voltage and a current when electric power is supplied by at least one of the electric generator and the storage battery (for example, 397, 393);
a transmission unit configured to transmit a measurement result that is measured by the measurement unit to a communicably connected external apparatus (for example, 35); and
a control unit configured to, upon receiving a response to the transmission by the transmission unit from the external apparatus, display information to a user on a display unit in accordance with response information that is received (for example, 31).

According to this embodiment, when the portable electric power supply apparatus is supplying electric power, information according to the usage circumstances can be transmitted to an external apparatus in real time, and useful information can be presented to the user in accordance with a response from the information processing apparatus.

17. A portable electric power supply apparatus supplying electric power to a detachably connected electrical device of above-mentioned embodiment comprises:
at least one of an electric generator and a storage battery configured to supply electric power to the connected electrical device (for example, 38, 40);

a measurement unit configured to measure a voltage and a current when electric power is supplied by at least one of the electric generator and the storage battery (for example, 397, 393); and a storage unit configured to store a measurement result that is measured by the measurement unit (for example, 32).

According to this embodiment, information used for switching a treatment that is adopted with respect to a user according to the connected electrical device can be suitably stored, while keeping down the production cost of the portable electric power supply apparatus.

18. In a rental system including a portable electric power supply apparatus supplying electric power to a detachably connected electrical device, and an information processing apparatus managing usage circumstances of the portable electric power supply apparatus at a rental destination of the above-mentioned embodiment, the portable electric power supply apparatus comprises:

at least one of an electric generator and a storage battery configured to supply electric power to the connected electrical device, a measurement unit configured to measure a voltage and a current when electric power is supplied by at least one of the electric generator and the storage battery, a transmission unit configured to transmit a measurement result that is measured by the measurement unit to a communicably connected external apparatus, and a control unit configured to, upon receiving a response to the transmission by the transmission unit from the external apparatus, display information to a user on a display unit in accordance with response information that is received; and the information processing apparatus comprises:

an acquisition unit configured to acquire information according to the usage circumstances of the portable electric power supply apparatus, an estimation unit configured to estimate a type of an electrical device that is connected, based on a measurement result with respect to a voltage and a current when the portable electric power supply apparatus supplied electric power that is included in the information according to the usage circumstances, a determination unit configured to determine whether or not an electrical device that is estimated by the estimation unit is a predetermined designated device, a decision unit configured to decide on a user treatment with respect to a user that rented the portable electric power supply apparatus, in accordance with a determination result obtained by the determination unit, and a notification unit configured to notify a user treatment that is decided on by the decision unit to the portable electric power supply apparatus.

According to this embodiment, a treatment that is adopted with respect to a user can be varied in accordance with whether or not an appropriate electrical device was utilized, and the user can thus be encouraged to appropriately utilize the electric power supply apparatus. By this means, deterioration of the portable electric power supply apparatus can be suppressed as much as possible.

The present invention is not limited to the above embodiments and various changes and modifications can be made within the spirit and scope of the present invention. Therefore, to apprise the public of the scope of the present invention, the following claims are made.

What is claimed is:

1. A system comprising a portable electric power supply apparatus supplying electric power to a detachably connected electrical device, and an information processing apparatus managing usage circumstances at a rental destination of the portable electric power supply apparatus at a rental destination, the portable electric power supply apparatus comprising:

at least one of an electric generator and a storage battery configured to supply electric power to the connected electrical device, at least one sensor configured to measure a voltage and a current when electric power is supplied by at least one of the electric generator and the storage battery;

a first storage device that stores instructions, and stores a measurement result that is measured by the at least one sensor as information according to the usage circumstances at a rental destination of the portable electric generator; and at least one first processor that executes the instructions to:

read out a measurement result stored in the first storage device, and transmit the read out measurement result to a communicably connected external apparatus, and upon receiving a response to the transmission of the measurement result from the external apparatus, display information to a user on a display unit in accordance with response information that is received; and the information processing apparatus comprising:

a second storage device that stores instructions; and at least one second processor that executes the instructions to:

acquire information according to the usage circumstances of the portable electric power supply apparatus;

estimate a type of an electrical device that is connected, based on a measurement result with respect to a voltage and a current when the portable electric power supply apparatus supplied electric power, wherein the measurement result is included in the information according to the usage circumstances;

determine whether or not an electrical device that is estimated is a predetermined designated device; and decide on a user treatment with respect to a user that rented the portable electric power supply apparatus, in accordance with a determination result.

2. The system according to claim 1, wherein the at least one first processor executes instructions in the first storage device to:

perform radio communication with the information processing apparatus; and receive the information according to the usage circumstances that is transmitted through the communication means from the portable electric power supply apparatus during a period in which the portable electric power supply apparatus is supplying electric power.

3. The system according to claim 2, wherein the at least one second processor executes instructions in the second storage device to:

in a case where the determination result indicates that the estimated electrical device is not the designated device, notify warning information indicating that the estimated electrical device is not the designated device to the portable electric power supply apparatus.

4. The system according to claim 3, wherein,
the warning information includes screen information of a warning screen that is displayed on a display apparatus provided in the portable electric power supply apparatus, and
information indicating that a penalty will be imposed is displayed on the warning screen, and a choice regarding whether to continue supplying electric power or stop supplying electric power to the estimated electrical device is displayed in a selectable manner on the warning screen.

5. The system according to claim 3, wherein the at least one second processor executes instructions in the second storage device to:
in a case where the determination result indicates that the estimated electrical device is not the designated device, and which is a case where it is indicated that an inrush current of the portable electric power supply apparatus is less than a rated current of the portable electric power supply apparatus and an amount of discharge in a predetermined time unit is less than a predetermined threshold value, notify screen information of a registration screen for registering information relating to the estimated electrical device to the portable electric power supply apparatus.

6. The system according to claim 5, wherein the at least one second processor executes instructions in the second storage device to:
notify, as the screen information, information according to a registration URL for registering information relating to the estimated electrical device to the portable electric power supply apparatus.

7. The system according to claim 3, wherein,
in a case where the determination result indicates that the estimated electrical device is the designated device, guidance information that provides guidance regarding an appropriate usage method of the designated device is notified to the portable electric power supply apparatus.

8. The system according to claim 1, wherein,
the portable electric power supply apparatus comprises a USB interface;
the information according to the usage circumstances that is stored in the portable electric power supply apparatus is read through the USB interface to a terminal of a service provider that rented out the portable electric power supply apparatus, when the portable electric power supply apparatus is returned; and
after the portable electric power supply apparatus is returned to the service provider, wherein the at least one second processor executes instructions in the second storage device to receive the information according to the usage circumstances from the terminal through a network.

9. The system according to claim 1, wherein the at least one second processor executes instructions in the second storage device to:
in a case where the determination result indicates that the estimated electrical device is the designated device, decide on a user treatment that grants a special privilege to the user, and
in a case where the determination result indicates that the estimated electrical device is not the designated device, decide on a user treatment that imposes a penalty on the user.

10. The system according to claim 9, wherein,
the user treatment that grants a special privilege to the user is a discount on a rental fee for the portable electric power supply apparatus, and
the user treatment that imposes a penalty on the user is a surcharge on a rental fee for the portable electric power supply apparatus.

11. The system according to claim 10, wherein the at least one second processor executes instructions in the second storage device to:
calculate a rental fee in accordance with a user treatment that is decided, and the measurement result; and
transmit the rental fee that is calculated to a terminal of a service provider that rented out the portable electric power supply apparatus.

12. The system according to claim 1, wherein,
the portable electric power supply apparatus comprises a storage battery, and
wherein the at least one second processor executes instructions in the second storage device to:
determine whether or not a usage method is within a predetermined range, based on a charging result showing charging information that is included in the information according to the usage circumstances, and the measurement result, and
decide on a user treatment in accordance with a determination result.

13. The system according to claim 1, wherein the at least one first processor executes instructions in the first storage device to:
supply electric power from at least one of an electric generator or a storage battery.

14. A method employing a portable electric power supply apparatus supplying electric power to a detachably connected electrical device, and an information processing apparatus managing usage circumstances at a rental destination of the portable electric power supply apparatus at the rental destination, the portable electric power supply apparatus comprising at least one of an electric generator and a storage battery configured to supply electric power to the connected electrical device, the method comprising:
measuring a voltage and a current when electric power is supplied by at least one of an electric generator and a storage battery provided in the portable electric power supply apparatus configured to supply electric power to the connected electrical device;
reading out a measurement result stored in the first storage device, and transmitting the read out measurement result to a communicably connected external apparatus, and
upon receiving a response to the transmission of the measurement result from the external apparatus, displaying information to a user on a display unit in accordance with response information that is received; and
the managing of the usage circumstances further comprises:
acquiring information according to the usage circumstances of the portable electric power supply apparatus;
estimating a type of an electrical device that is connected, based on a measurement result with respect to a voltage and a current when the portable electric power supply apparatus supplied electric power, wherein the measurement result is included in the information according to the usage circumstances;

determining whether or not an electrical device which is estimated by the estimating is a predetermined designated device; and deciding on a user treatment with respect to a user that rented the portable electric power supply apparatus, in accordance with a determination result obtained by the determining.

\* \* \* \* \*